United States Patent
Gorectke et al.

(10) Patent No.: US 12,549,265 B2
(45) Date of Patent: Feb. 10, 2026

(54) USING EXPANDED METADATA TO SELECT AMONG AVAILABLE WIRELESS NETWORKS

(71) Applicant: Quixotic Holdings, LLC, Fife, WA (US)

(72) Inventors: Charles Robert Gorectke, Lakeland, FL (US); Christopher Michael Garman, Pittsburgh, PA (US); Anthony Samuel Jacobs, Olney, MD (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 964 days.

(21) Appl. No.: 17/489,453

(22) Filed: Sep. 29, 2021

(65) Prior Publication Data

US 2023/0096676 A1   Mar. 30, 2023

(51) Int. Cl.
*H04B 17/318* (2015.01)
*H04W 8/00* (2009.01)
*H04W 24/08* (2009.01)
*H04W 72/54* (2023.01)
*H04W 72/56* (2023.01)

(52) U.S. Cl.
CPC .......... *H04B 17/318* (2015.01); *H04W 8/005* (2013.01); *H04W 24/08* (2013.01); *H04W 72/54* (2023.01); *H04W 72/56* (2023.01)

(58) Field of Classification Search
CPC .... H04B 17/318; H04W 72/54; H04W 72/56; H04W 8/005; H04W 24/08
See application file for complete search history.

(56) References Cited

U.S. PATENT DOCUMENTS

| 10,178,509 | B1  |   | 1/2019 | Perdew et al. |         |
|------------|-----|---|--------|---------------|---------|
| 2020/0382981 | A1 | * | 12/2020 | Kachemir ............. | H04W 64/00 |
| 2021/0168816 | A1 | * | 6/2021  | Atefi ..................... | H04W 28/18 |

FOREIGN PATENT DOCUMENTS

CN   105578529 A   *   5/2016

OTHER PUBLICATIONS

Arkko et al., "Network Discovery and Selection Problem," IETF Informational Memo, RFC 5113, Jan. 2008, 39 pages.
Calhoun et al., "Control and Provisioning of Wireless Access Points (CAPWAP) Protocol Binding for IEEE 802.11," IETF Technical Specification Memo, RFC 5416, Mar. 2009, 76 pages.

(Continued)

*Primary Examiner* — Saad A. Waqas
(74) *Attorney, Agent, or Firm* — Seed Intellectual Property Law Group LLP

(57) ABSTRACT

A facility for generating a network announcement message for a first communication device is described. In the message generated by the facility, first data encodes values determined for the first communication device of standard attributes specified by a wireless networking standard. Second data encoded values determined for the first communication device of expanded attributes including at least one expanded attribute characterizing the first communication device's connection to an internetwork. The message is usable by a second communication device that receives the message to compare the first communication device to other communication devices to which the second communication device is capable of connecting.

10 Claims, 17 Drawing Sheets

(56) References Cited

OTHER PUBLICATIONS

IEEE, "Part 11: Wireless LAN Medium Access Control (MAC) and Physical Layer (PHY) Specifications, Amendment 5: Preassociation Discovery," *IEEE Standard for Information Technology—Telecommunications and information exchange between systems, Local and metropolitan area networks—Specific Requirements*, IEEE Std 802.11aq™-2018, Jun. 14, 2018, 69 pages.

\* cited by examiner

| Individual Participant Information | | | | | Other Participants that are within Line-of-Sight | | | | | |
|---|---|---|---|---|---|---|---|---|---|---|
| Participant Identifier | Kinematics | Spectrum Capabilities | Timestamp | Public Key | Line-of-sight Participant Identifier | Quality of Signal | Frequency Capability | Spectrum Capability | Public Key | Weighted Value Between Pair |
| C | | | | | A | | | | | ⎱ 148a |
| | | | | | B | | | | | ⎰ 148b |
| E | | | | | F | | | | | ⎱ 148c |
| | | | | | G | | | | | ⎰ 148d |
| 128 | 130 | 131 | 132 | 133 | 134 | 136 | 138 | 140 | 141 | 144 |

126a, 126b — 122 (Individual Participant Information), 124 (Other Participants that are within Line-of-Sight), 120

*FIG. 3*

| node attribute table |||
|---|---|---|
| node D |||
| attribute type | attribute name | attribute value |
| standard | SSID | Ogrid_94671 |
| | bandwidth | 35 |
| | load factor | 65 |
| | security level | 85 |
| | signalling robustness | 30 |
| | MIMO capability | no |
| | subchannel characteristics | default |
| expanded | Direct | no |
| | Internet | yes |
| | Hop Count | 2 |

*FIG. 7* node attribute table

| node Z | | | |
|---|---|---|---|
| attribute type | attribute name | attribute value | |
| standard | SSID | Webster_Library | 811 |
| | bandwidth | 85 | 812 |
| | load factor | 25 | 813 |
| | security level | 20 | 814 |
| | signalling robustness | 45 | 815 |
| | MIMO capability | yes | 816 |
| | subchannel characteristics | default | 817 |
| expanded | Direct | | 821 |
| | Internet | | 822 |
| | Hop Count | | 823 |

USING EXPANDED METADATA TO SELECT AMONG AVAILABLE WIRELESS NETWORKS

BACKGROUND

Mobile communication devices such as smart phones have become an integral part of the lives of many people; the number of mobile communication devices in use continues to grow. These mobile communication devices are powerful computers that can connect via various data paths and protocols.

It is common for mobile communication devices—that are in particular geographic locations, at particular times—to be able to choose among multiple available wireless networks. The conventional ways that mobile communication devices handle this choice are to either (1) automatically select the network whose access point has the highest signal strength to the device, or (2) ask the user to select among the networks, based on such factors as signal strength and network name.

BRIEF DESCRIPTION OF THE DRAWINGS

FIG. 3 illustrates an example participant table 120 that tracks participants in the cognitive heterogeneous ad hoc mesh network in accordance with embodiments described herein.

FIG. 7 is a table diagram showing first sample contents of a node attribute table showing attribute values determined by the facility for node D shown in FIG. 5.

FIG. 8 is a table diagram showing second sample contents of a node attribute table showing attribute values determined by the facility for node Z shown in FIG. 5.

FIG. 9, which spans three sheets of drawings, is a flow diagram showing a process performed by the facility in some embodiments in a node to choose a wireless network access point for the node to connect to.

DETAILED DESCRIPTION

Figure 1A:
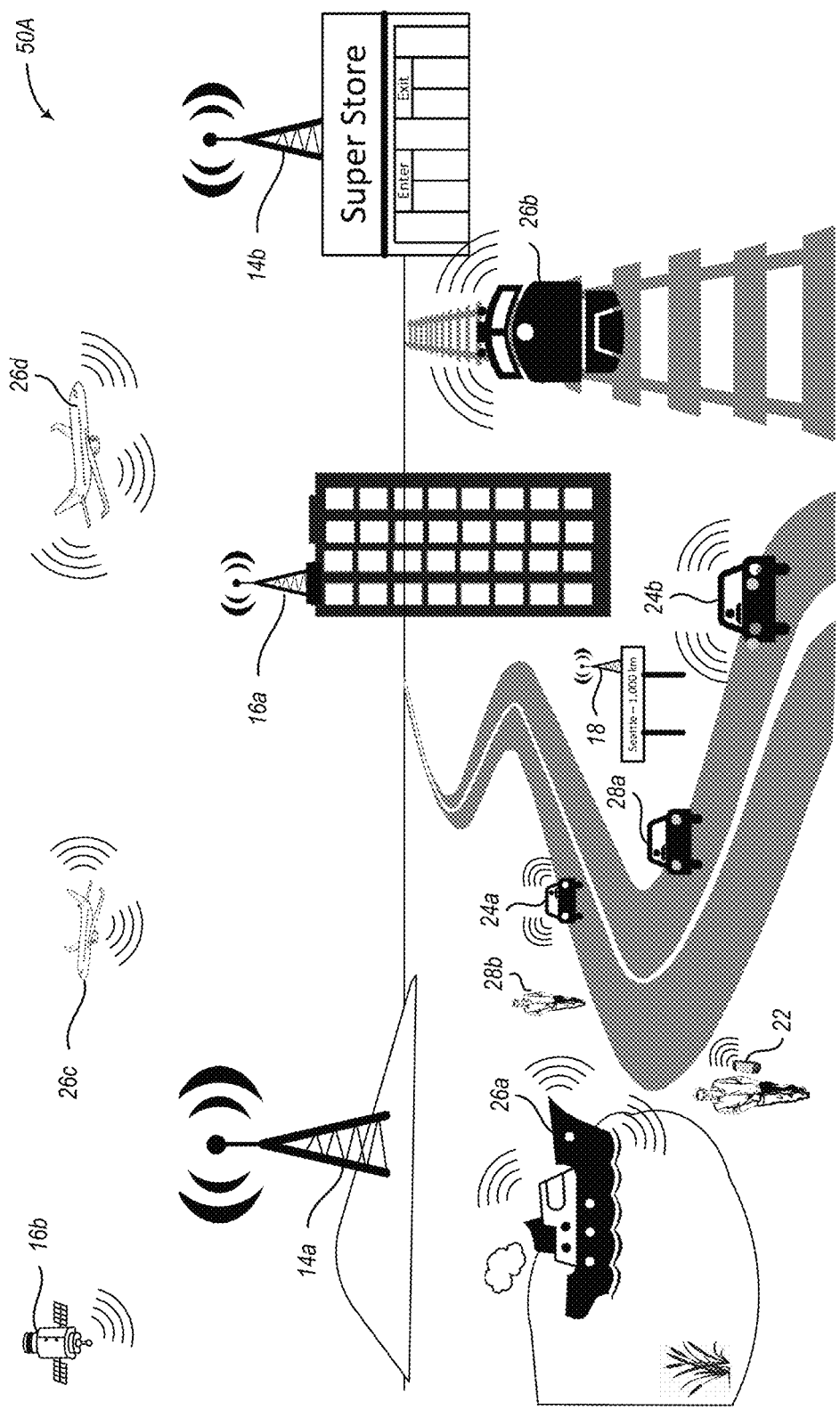
FIGS. 1A-1B illustrate context diagrams of an environment for establishing an ad hoc mesh network in accordance with embodiments described herein.

The inventors have identified disadvantages in the conventional approach to selecting among available wireless networks. In particular, the conventional approach fails to consider significant factors such as aspects of the quality of the connection to the network beyond signal strength, the security level of the network, and the availability and latency of a connection to the Internet from the wireless network. It is further often necessary to join a network in order to determine that it is unsuitable, requiring several join-and-depart cycles with different networks to arrive at one that is acceptable, which are typically manually-managed.

In response to recognizing these disadvantages, the inventors have conceived and reduced to practice a software and/or hardware facility for selecting among available wireless networks using expanded metadata ("the facility"). The facility has particular applicability to wireless peer-to-peer networks, in which many or all of the nodes serve as access points to the network. Nodes in a wireless peer-to-peer network are often referred to as "communication devices." Nodes may include "network participants, "mobile participants," or "participants" that have, maintain, and/or announce expanded metadata as described herein. Nodes may also include "non-participants" that do not have, maintain, or announce the expanded metadata.

In various embodiments, the facility is implemented as software and/or hardware installed and operating in participants, such as software and/or hardware that manages one or more ad hoc mesh networks; in some embodiments, aspects of the facility that support one or more ad hoc mesh networks are installed and operate in computing systems other than network participants. In various embodiments, the mesh networks operated by the facility are wireless networks, line-of-sight networks of other types, or wired or guided networks.

The facility includes software or firmware installed in some or all of the nodes of a wireless peer-to-peer network that causes each node to maintain extended metadata about the node and its connection to other nodes and—directly or indirectly—the Internet, in addition to standard metadata specified by one or more wireless standards. The facility causes each node to periodically advertise, "announce," or "broadcast" its expanded and standard metadata, such as in periodic beacon frame announcement messages or other network announcement messages announcing the node's availability as a network access point. Such announcement messages may also be referred to as identification messages, advertisement messages, self report messages, self reporting messages, or the like. In some embodiments, these network announcement messages may include or be a part of notification signals described herein. As such, a participant node may broadcast a notification signal may operate as the network announcement message by including the participant node's expanded and standard metadata. Non-participant nodes may also broadcast network announcement messages that include its standard metadata, but not the expanded metadata. Accordingly, "advertising node" or "announcing node" may refer to participant nodes or non-participant nodes, with the participant nodes providing standard and expanded metadata and the non-participant nodes providing standard metadata—but not expanded metadata. In a node seeking to connect to a network, the facility collects standard metadata about each other node whose announcement messages it can receive—and expanded metadata where the advertising node provides it; it uses that metadata—together with other information about the node observed in receiving the node's advertising message—to select from among the advertising nodes one to connect to. Accordingly, the facility executing on the participant node selects another participant node or a non-participant node to connect to.

In some embodiments, the facility first classifies the advertising nodes (also sometimes called "access point nodes" herein) into categories based on (1) whether they are participants in a wireless peer-to-peer network; (2) whether they are connected to the Internet, either directly or indirectly; and (3) how direct their connection to the Internet is. In some embodiments, the facility further selects among the nodes assigned to the most highly-ranked category to which one or more nodes were assigned, using such factors as signal strength; bandwidth, load level, security level, signaling robustness, and/or subchannel characteristics.

By performing in some or all of the ways described above, the facility consistently selects a well-suited network on the first try, generally without requiring any repetition or other manual intervention. The selected access point node provides a higher-capacity, lower-latency, and/or more secure connection to the network than would a node chosen using a conventional approach.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, the facility conserves data transmission and processing resources among network nodes that would be required to repeatedly join and leave networks to test their suitability.

In some embodiments, the facility operates in wireless mesh networks, or wireless ad hoc networks—in which wireless communication devices ("communication devices," "network participants, "mobile participants," or "participants") communicate directly with one another without relying on centralized management of the network.

As referred to herein, a "participant" is an object that includes a computing device that can communicate specific, predetermined types of information and data to other participant objects via wireless or other communications means. In some embodiments, each participant may be a member of a universal service-level agreement to identify which objects are participants, which allows for participants to communicate with one another without having to get user authorization for each individual connection between participants.

As discussed in more detail herein, participants can be mobile or stationary and may include computing devices of different sizes having different computing or networking capabilities. Throughout this disclosure, the term "participant" is used interchangeably with "participant object" and "participant computing device", and the term "non-participant" is used interchangeably with "non-participant object" and other related variations. The term "node" may include "participants," "non-participants," or both.

As referred to herein, "line-of-sight communication" refers to wireless or wired transmission of information from a participant to another participant without other retransmission devices. A line-of-sight communication may also be referred to as a single hop from one participant to another participant or a direct communication between participants. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

Figure 1B:
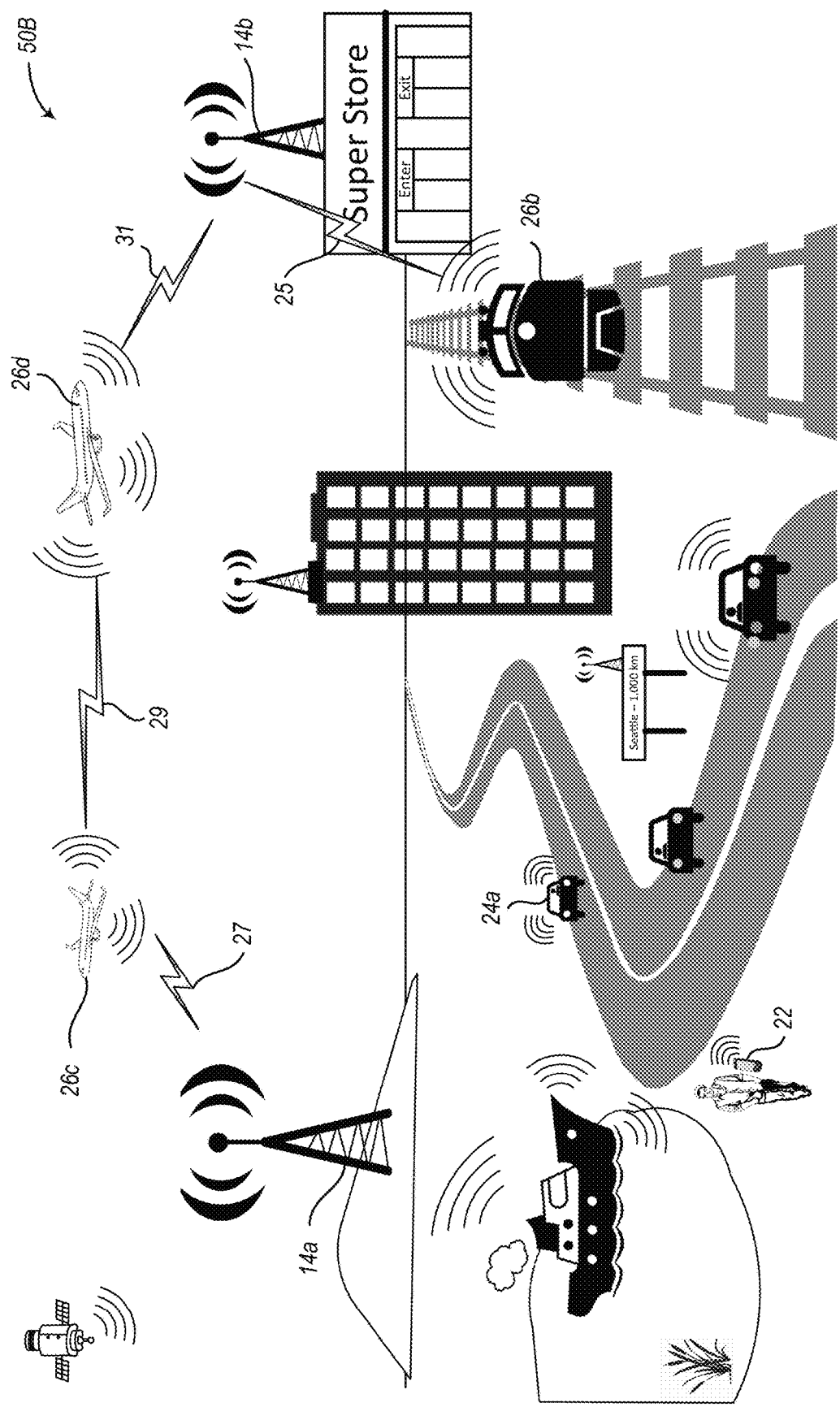

FIGS. 1A-1B illustrate context diagrams of an environment for establishing an ad hoc mesh network in accordance with embodiments described herein. In various embodiments, the facility may implement some or all embodiments described herein with respect to generating and maintaining the ad hoc mesh network. Environment 50A in FIG. 1A includes a plurality of mobile participants (referenced in some figures as mobile participants 36), a plurality of stationary participants (referenced in other figures as stationary participants 34), and a plurality of non-participants 28a-28b. As mentioned above, the stationary participants and the mobile participants can communicate specific types of information or data with one another, but cannot communicate the same types of information with the non-participants 28a-28b.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, the size or type or accuracy of the antenna utilized, etc.

For example, tier 1 mobile participants typically have the smallest available power, lowest processing power, lowest bandwidth, shortest ranged antenna, lowest power output, lowest accuracy, and slowest update rate. Examples of tier 1 mobile participants include, but are not limited to, mobile phones, laptop computers, tablet computers, wearable computing devices, or other smaller, low power, low transmission mobile computing or Internet-Of-Things devices. In the example illustrated in FIG. 1A, there is only a single tier 1 mobile participant 22, which happens to be a mobile phone in this example. However, other numbers and types of tier 1 mobile participants may also be employed.

Tier 2 mobile participants typically have medium power constraints, a medium amount of processing power, medium bandwidth, medium range capabilities, medium accuracy, and medium update rate. Examples of tier 2 mobile participants include, but are not limited to, automobiles, small personal boats, personal aircrafts, or other medium power, medium transmission, power regenerating mobile computing devices or objects that can support such mobile computing devices. FIG. 1A illustrates example tier 2 mobile participants as including automobiles 24a and 24b. However, other numbers and types of tier 2 mobile participants may also be employed.

Tier 3 mobile participants typically have the largest available power, highest processing power, highest bandwidth, longest transmit and receive capabilities, highest accuracy, and fastest update rate among mobile participant computing devices. Example tier 3 mobile participants include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants as including boat 26a, train 26b, and airplanes 26*c* and 26*d*. However, other numbers and types of tier 3 mobile participants may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data request from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14*a* and superstore 14*b*. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16*a* and satellite 16*b*. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another, which is further illustrated in FIG. 1B.

Environment 50B in FIG. 1B provides additional details regarding environment 50A in FIG. 1A, and likewise includes a plurality of mobile participants, a plurality of stationary participants, and a plurality of non-participants. Participants can communicate with other participants or with non-participants by forwarding communications between participants. Each participant utilizes a locally stored participant table to determine a next participant in which to send communications along an optimum route between the sending participant and the destination device, which is described in more detail below.

Briefly, however, in this example, participant airplane 26*c* is attempting to communicate with participant train 26*b*. If participant airplane 26*c* is within line-of-sight of train 26*b*, then the two participants could communicate directly with one another. But if airplane 26*c* cannot directly communicate with train 26*b*, then airplane 26*c* will communicate with train 26*b* via other participants.

Airplane 26*c* utilizes a participant table to identify one or more routes from airplane 26*c* to train 26*b* via zero, one, or a plurality of other participants. Creation and update of the participant table is discussed in more detail below.

In some embodiments, each participant that forwards a communication message may modify the additional route information to remove route information for previous participants along the route, which allows subsequent participants to transmit less and less data for each hop along the route. In other embodiments, the additional route information is maintained so that the destination participant knows the route of the messages and can reuse the same route to transmit return messages to the originally sending participant, or the destination can recalculate a new route.

In some embodiments, a participant along the route may determine that it should re-calculate a route from that participant to the destination participant. In one embodiment, this determination may be based on the participant not being able to transmit messages to the next participant identified in the additional route information included with the messages, such as if the participant and the identified next participant are no longer in line-of-sight communication with one another. In another embodiment, the participant may re-calculate the route if the connection between the participant and the next participant has significantly deteriorated, e.g., the individual score between that corresponding participant pair has exceeded a threshold value. In one example, the individual score may change based on a system limitation of the participant or the next participant, such as if Doppler effects between the participant and the next participant exceeds a threshold value based on the antenna capabilities of the participant and the next participant. For the illustrated example, tower 14*a* may perform similar actions as airplane 26*c* by using the participant table to determine a next participant in which to forward the messages destined to train 26*b*.

In these examples, the communication links 25, 27, 29, and 31 are line-of-sight communication transmissions from one participant computing device to another. As described elsewhere herein, these transmissions may be non-directional transmissions or they may be directional transmissions.

Even though FIGS. 1A and 1B are illustrated with stationary participants, the line-of-sight communications described herein enables mobile participants to communicate with one another without having to be in line-of-sight communication of a stationary participant, which reduces the need for a complex stationary infrastructure. Moreover, embodiments described herein enable mobile participants to communicate with one another even if the stationary participants become unavailable or if wired communication networks between stationary participants become interrupted. Moreover, the stationary participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

As mentioned above, each participant can select another participant through which it can forward communication messages based on a participant table. The participant table identifies each participant, where each participant is located, how each participant is moving, which participants are within line-of-sight of each other, and various different characteristics or communication capabilities between line-of-sight participants. Creating, updating, and using the participant table is described below, and one example participant table is illustrated in FIG. 3.

The overarching ad hoc mesh network created by the mobile and stationary participants described above in conjunction with FIGS. 1A-1B provides a backbone for a multi-layered network that enables one participant to communicate with another participant, while also providing safety measures to avoid collisions among participants and non-participants.

Figure 2A:
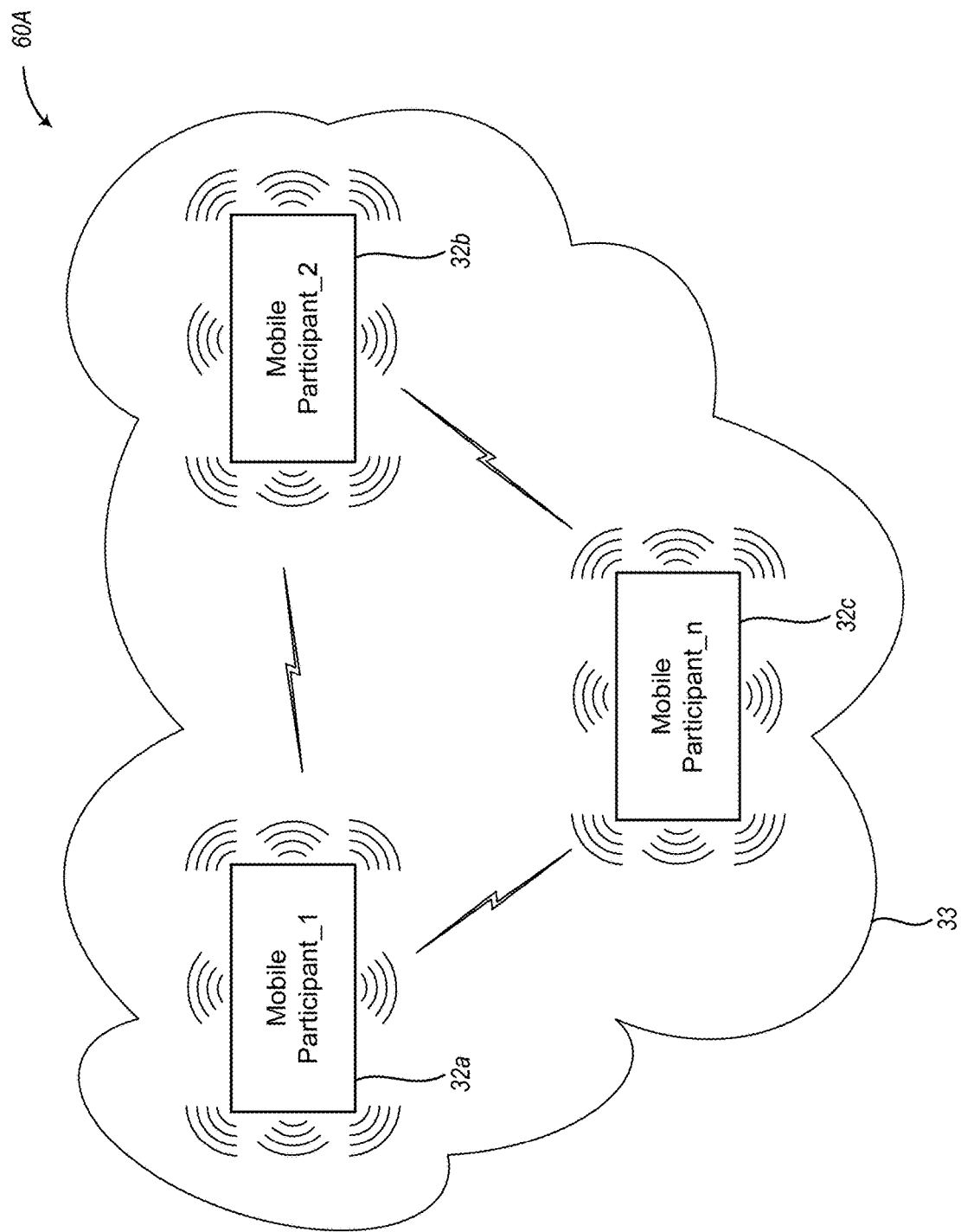
FIGS. 2A-2B illustrate block diagrams of the different layers of the ad hoc mesh network in accordance with embodiments described herein.
Figure 2B:
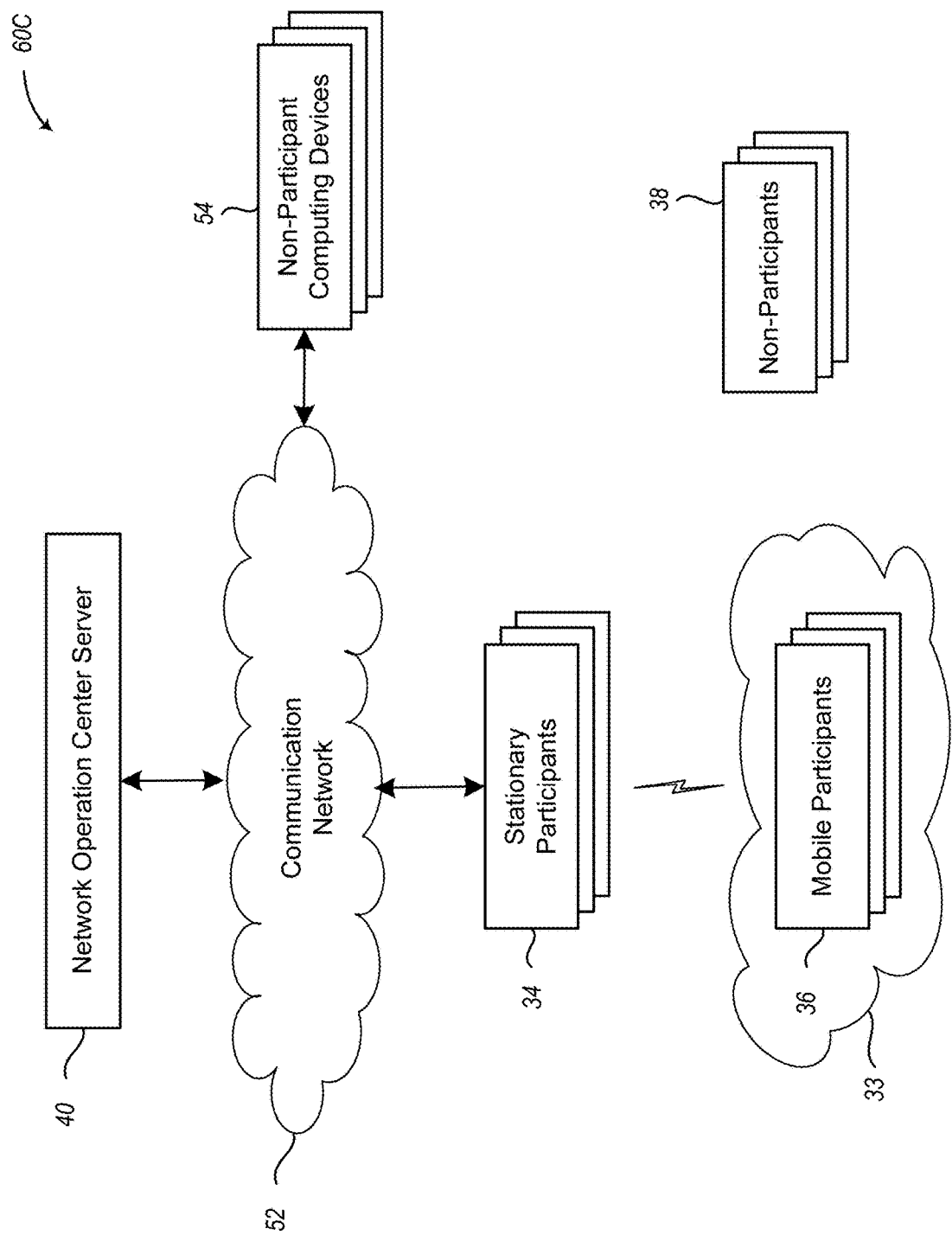

FIGS. 2A-2B illustrate block diagrams of the different layers of the ad hoc mesh network in accordance with embodiments described herein. FIG. 2A illustrates an example 60A of a communications network 33 between a plurality of mobile participants 32*a*-32*c*. Although FIG. 2A only illustrates three mobile participants as creating network 33, embodiments are not so limited and one or a plurality of mobile participants may be employed. Similarly, the network 33 may be established from other types of mobile participants, including various combinations of tier 1 mobile participants, tier 2 mobile participants, or tier 3 mobile participants, which perform many of the same functions as the mobile participants.

Each mobile participant 32*a*-32*c* transmits radio frequency signals to be received by other mobile participants 32 that are within line-of-sight of the sending mobile participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table described herein). In various embodiments, the notification signals provide individualized information regarding the sending mobile participant 32 so that other mobile participants 32 know that they are within line-of-sight communication of the sending mobile participant 32 within network 33. As mentioned above, these notification signals may be referred to as self-reporting signals, since the mobile participant 32 is independently reporting its position and kinematic information to any other mobile participants 32 that are within line-of-sight of the transmitting mobile participant 32 without being prompted or requested by another mobile (or stationary) participant. The mobile participants 32 utilize the notification signals to generate a participant table that is utilized to transmit data signals between the mobile participants 32.

In various embodiments, the information in the notification signal includes the mobile participant's 32 identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile participant 32 may be determined via traditional methods like GPS sensors or modules, cell tower or stationary participant signal triangulation, or via notification messages from other devices or participants that know or estimate the position or location of the mobile participant 32. This can be accomplished with extreme accuracy and minimal latency when notification messages are echoed and supported by stationary participants. The geolocation may also be referred to as the position or location of the mobile participant 32.

The kinematic information may be obtained by monitoring the mobile participant's 32 position and identifying changes over time, utilizing various sensors to calculate or determine the kinematic information, or obtaining it from another system.

The frequency capabilities of the mobile participant 32 may be predetermined based on the type of hardware utilized by the mobile participant 32. For example, the hardware of the mobile participant 32 may be designed to utilize ACARS, IEEE 802.11 standards, or some other wireless transmission frequencies or standards, which defines the frequency capabilities of the mobile participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile participant 32 or on the current processing capacity or network traffic of the mobile participant 32 or a number of other factors. For example, if the mobile participant 32 is a Boeing 737-700 then it may have more throughput capabilities than a Boeing 777-200ER because the Boeing 737-700 may have less passengers and thus may be supporting fewer data requests from user device onboard the airplane, which can allow for more possessing power to be directed towards forwarding communications between other participants.

In some embodiments, notification signals are transmitted via directional broadcast beams. In other embodiments, the notification signals may be transmitted using non-directional broadcast signals. In general, the use of the term "broadcast" herein refers to the transmission of a signal by a sending participant without being requested by another participant and does not have a specific participant as a destination. In various embodiments, directional notification signals may be transmitted in a sequential or non-sequential 360-degree pattern, so that the notification signal is transmitting in all directions surrounding the participant.

Use of directional transmissions can reduce the amount of power needed to transmit the notification signal or other communication to another participant. Moreover, the use of directional transmissions enables the sending participant to use just enough power to ensure it gets to its intended target. The participant table described herein enables the participants to calculate the required transmit power for transmission without wasting extra power on an overly powerful transmission. Additionally, directional transmissions can reduce interference between transmissions in a congested space as well as make transmissions more secure.

The notification signal may be broadcast periodically, at predetermined times, dynamically selected based on number and proximity of other mobile participants, or at a given dynamically changing update rate. In some embodiments, the rate at which the mobile participant 32 transmits its notification signal may change based on a combination of the distance, closure velocity, and closing angles between the sending mobile participant 32 and other mobile participants 32 within line-of-sight of the sending mobile participant 32.

As mentioned above, the mobile participants 32a-32c broadcast notification signals to inform other mobile participants 32 of their position and movement. For example, mobile participant 32a broadcasts notification signals with information identifying itself and its respective geolocation and kinematic information without regard to the presence or location of mobile participants 32b or 32c. If mobile participant 32c is within line-of-sight of mobile participant 32a, mobile participant 32c receives the broadcasted notification signals from mobile participant 32a and utilizes the information in the notification signals, and its own location and kinematic information, to identify the position and movement of mobile participant 32a relative to itself.

The mobile participants 32 can utilize the notification signals to track other participants and to create and update the participant table to identify which participants are in network 33, their location, their capabilities, and who they are in line-of-sight communication.

As mentioned above, the notification signals are utilized to generate and maintain a participant table so that the mobile participants 32 can transmit messages or data to one another within network 33. For example, the participant table is utilized to determine a recipient participant. The sending mobile participant 32 then transmits a data signal destined for a target mobile participant 32. The data signals are used to transmit the desired messages or data to other participants, which is described in more detail below in conjunction with FIG. 2B. Briefly, the various communications between the mobile participants 32a-32c creates a communication network 33 among each other that enable them to communicate with one another without the use of another communication backbone, such as a cellular tower network.

Similar to the notification signals, the data signals may be transmitted via directional transmission beams or non-directional transmission signals. In various embodiments, the sending mobile participant 32 utilizes the participant table to determine a location of the recipient participant. The sending mobile participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum. Participants can "sniff" the spectrum and identify free space to use and make such information available to other participants via the participant table. For example, if an airplane is in a thunderstorm it can identify and avoid those frequencies that are unusable for use in unstable whether, and it knows what participants are within range and what frequencies they have available to retransmit to a stationary participant, if required. From this information in the participant table, the aircraft can choose the appropriate frequency/frequencies to transmit on to obtain the highest data-rate while maintaining a signal to noise ratio that ensures data packet reception.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants, via the participant table, to determine the path and frequency on which to send the data. Once that is determined, the participant can route the data and amplify the signal based on the frequency, distance or latency to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize Wi-Fi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIG. 2A, the multi-layered network allows each participant to track other participants that are local or proximal to the participant, while also tracking transmitted data among participants. The multi-layered network also includes a top layer that provides global tracking of participants and non-participants, and data communication with non-participant computing devices, which is illustrated in FIG. 2B.

FIG. 2B illustrates a block diagram of the highest layer of the multi-layered network. Example 60C in FIG. 2B includes mobile participants 36, stationary participants 34, and network operation center server 40.

Mobile participants 36 and stationary participants 34 employ embodiments described herein to transmit notification signals to generate a participant table to track participants, their location, and the communication characteristics between line-of-sight participants. In various embodiments each stationary participant 34 stores a complete copy of the participant table. When a stationary participant 34 receives an update to the participant table from a mobile participant 36, the stationary participant 34 transmits the update to the other stationary participants 34. The stationary participants 34 also transmit, upon receipt of an update or at predetermined times, the total participant table or only a portion thereof to the mobile participants 36 that are in line-of-sight communication of that corresponding stationary participant 34, which can then be forwarded by the mobile participants 36 to other non-line-of-sight mobile participants 36.

In some other embodiments, the stationary participants 34 may maintain or store a portion, but not all, of the total participant table. For example, each stationary participant 34 stores the portion of the participant table for mobile participants 36 that are within a predetermined distance or number of hops away from the corresponding stationary participant 34. In at least one such embodiment, the stationary participants 34 may provide updates to the network operation center server 40 via communication network 52, which can then distribute the update, i.e., only the update, the total participant table, or a portion of the participant table, to other stationary participants 34. In some embodiments, the network operation center server 40 or the stationary participants 34 can add additional information to the participant table, such as the location of non-participants, which may be obtained from FAA reports, weather radar, local tracking by the mobile participants 36 or the stationary participants 34, or other sources.

As discussed herein, mobile participants 36 utilize the participant table to transmit or forward data or data requests to other mobile participants 36 or to non-participant computing devices 54. Accordingly, the mobile participants 36 communicate with stationary participants 34 (either via line-of-sight communications or via one or more other mobile participants 36) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

In various embodiments, the mobile participants 36 may also provide additional information to the stationary participants 34 and to the network operation center server 40. For example, in some embodiments, the mobile participants 36 may utilize echo signals from the notification signals to track non-participant objects 38, which is described in more detail in U.S. patent application Ser. No. 15/892,259, filed Feb. 8, 2018, entitled "Object Tracking Using A Cognitive Heterogeneous Ad Hoc Mesh Network."

FIG. 3 illustrates an example participant table 120 that tracks participants in the cognitive heterogeneous ad hoc mesh network in accordance with embodiments described herein. Participant table 120 includes individual participant information 122 and line-of-sight participant information 124.

The individual participant information 122 separately identifies multiple participants 126a-126b. For each participant 126a-126b, the individual participant information 122 includes an identifier 128 for the corresponding participant 126a-126b, and kinematic information 130 of the corresponding participant 126a-126b which can include location information of the corresponding participant 126a-126b. Spectrum capabilities 131 of the corresponding participant 126a-126b describe the available media types associated with this node. Also included is a timestamp 132 indicating the time at which the information for the corresponding participant 126a-126b was determined or updated, and a public key 133 determined by the participant computing this table 120 for the peer participant 126a-126b. The individual participant information 122 may also include other information, not shown, such as radio or processing capabilities of the corresponding participant, security protocols or encryption information, system limitations, or other information.

The line-of-sight participant information 124 lists those participants that are within line-of-sight communication of participants 126a-126b, which establishes each participant pair in the participant table 120. For example, corresponding line-of-sight participants 148a-148b are in line of sight of participant 126a.

The line-of-sight participant information 124 includes an identifier 134 for each corresponding line-of-sight participant 148a-148d, a quality of signal 136 for the notification signal sent by the corresponding line-of-sight participant 148a-148d that was received by the corresponding participant 126a-126b, frequency capability 138 and spectrum 140 capabilities of each corresponding line-of-sight participant 148a-148d, and a public key 141 determined by the participant computing this table 120 for each of the other line-of-sight participant.

In some embodiments, the line-of-sight participant information 124 also includes the weighted value 144 between each corresponding participant pair. The weighted value 144 is the individual score for that corresponding participant pair, which is based on a weighted combination of the latency in transmissions between the pair participants, movement of the participants relative to one another (e.g., based on the difference between the kinematic information 130 of each participant in the pair), quality of signal 136 between the pair participants, frequency 138 and spectrum 140 capabilities between the pair participants (e.g., based on the spectrum capabilities 131), whether the timestamp 132 is beyond some threshold amount of time in the past, other information, or any combination thereof. Distance may be a factor of latency because a total latency of a transmission is based on a processing time to transmit a communication, a flight time of the transmission (based on the distance between the participants and the speed at which radio waves propagate through the air), and a processing time to receive the communication.

Each of these types of information may be provided an initial score (e.g., if two airplanes are within 200 meters of each other then it may have a better, lower score than two airplanes 2 kilometers apart), which may be based on one or more thresholds or may be actual values. Each type of information is then weighted based on various factors that can impact the communication between the participant pairs. For example, in some situations, quality of signal may be more important and weighted higher than latency, but kinematic information may be more important and weighted higher than quality of signal (e.g., due to the potential data loss issues from Doppler effect or the potential to be out of line-of-sight). Thus, each type of information may be weighted based on its importance relative to the other types of information such that more important information has a higher weight than lower important information.

In at least one embodiment, the individual score between a participant pair may be based on system limitations of one or both of the participants in the participant pair. For example, participant antennas can generally account for some amount of Doppler shift/effects. However, if the participants of a participant pair are traveling towards one another at a high enough rate of speed, then the antennas may not be able to account for the Doppler shift/effects, which may result in a reduction of quality of service, throughput, or dropped information. Such system limitations may impact the individual score, which can result in calculating a route to avoid participant pairs that currently have or may have system limitations. In at least one such embodiment, one or more thresholds may be employed such that as the Doppler shift/effect becomes worse, the individual score also gets worse (e.g., increases).

In some embodiments, system limitations may be included in the participant table or may be deduced from information within the participant table. In other embodiments, some of these system limitations may not be included in the participant table or may change based on movement of the participants, which can result in increased latency or re-routing the communication.

In various embodiments, each corresponding participant 126 updates its locally stored version of the participant table 120. Stationary participants can update the participant table 120 maintained by the stationary participants based on the information contained in the notification signal sent by the participants 126.

While FIG. 3 shows a table whose contents and organization are designed to make it more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

The operation of certain aspects will now be described with respect to FIG. 4. In at least one of various embodiments, process 150 described in conjunction with FIG. 4 may be implemented by or executed on one or more computing devices, such as mobile participants 36 or stationary participants 34.

Figure 4:
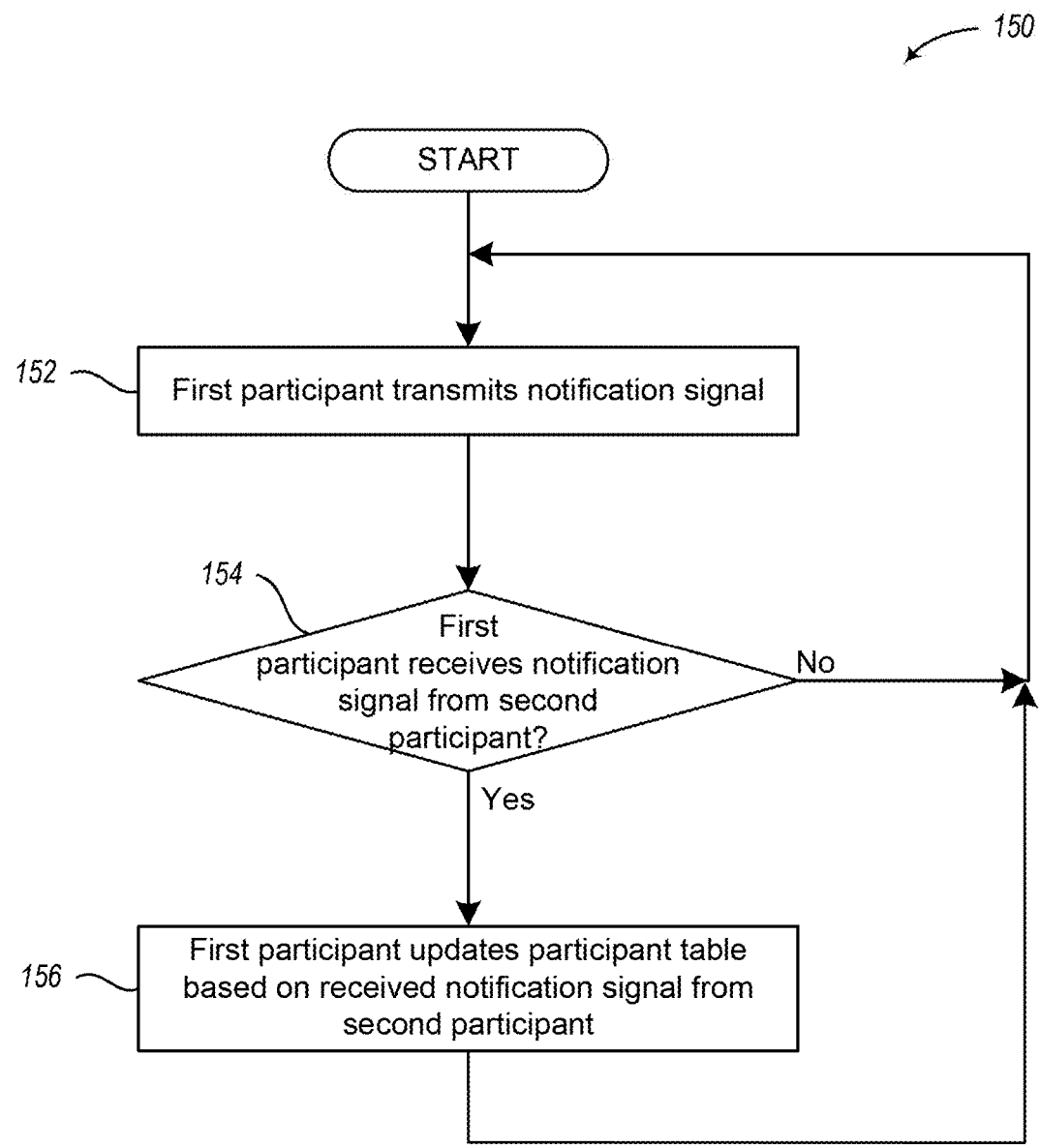
FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

Process 150 begins at act 152, where a first mobile participant transmits a notification signal. In various embodiments, the first participant transmits the notification signal at a predetermined rate, periodically, at predetermined times, or based on various operating characteristics of the first participant. The rate at which notification signals are transmitted may be static or dynamic and may change based on the distance and rate of closure between other participants or the number of other participants within line-of-sight of the first participant.

Process 150 proceeds to decision act 154, where the first participant receives a notification signal from a second participant. In various embodiments, the first participant may process each notification signal sent by the second participant and received by the first participant. In other embodiments, the first participant may process a subset of the notification signals received from the second participant. If the first participant has received a notification signal from the second participant and the first participant is to process the notification signal, then process 150 flows to act 156; otherwise process 150 returns to act 152 to continue sending its notification signals and waiting for notification signal from other participants.

At act 156, the first participant updates its local version of the participant table based on the information in the received notification signal from the second participant. If the second participant is not in the participant table as being within line-of-sight communication of the first participant, the first participant adds the second participant to the participant table indicating that the first and second participants are within line-of-sight communication of one another, as a participant pair. If the second participant is already listed in the participant table, the first participant updates the participant table with the information from the received notification signal, such as the current location and kinematic information from the second participant. In some embodiments, the first participant updates the participant table to include additional information regarding the communication with the second participant, such as the quality of signal received from the second participant, signal to noise ratio, frequency or spectrum capabilities, etc. After act 156, the first participant continues in act 152.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5A:
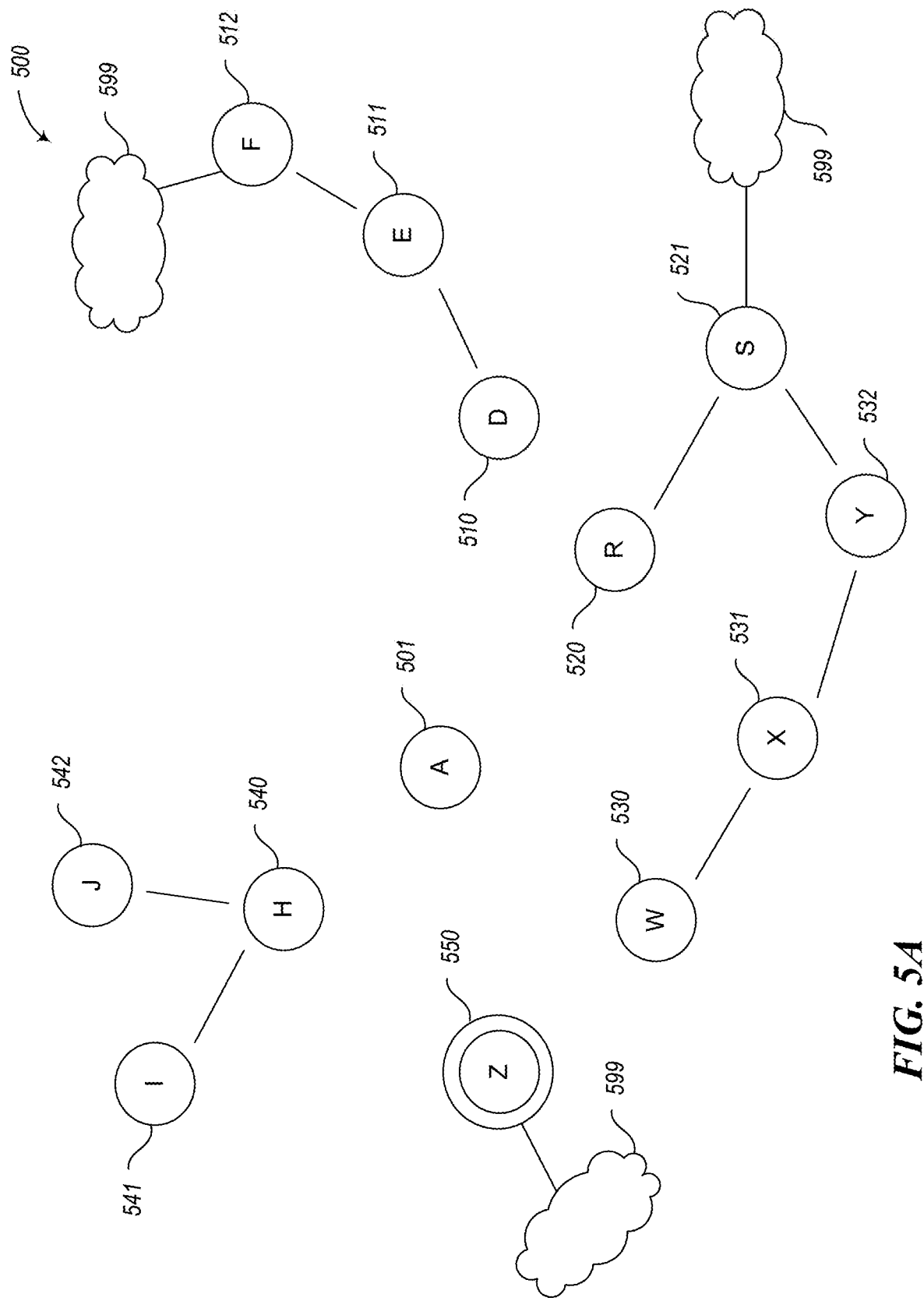
FIG. 5A is a network diagram showing a first sample environment in which the facility operates.
Figure 5B:
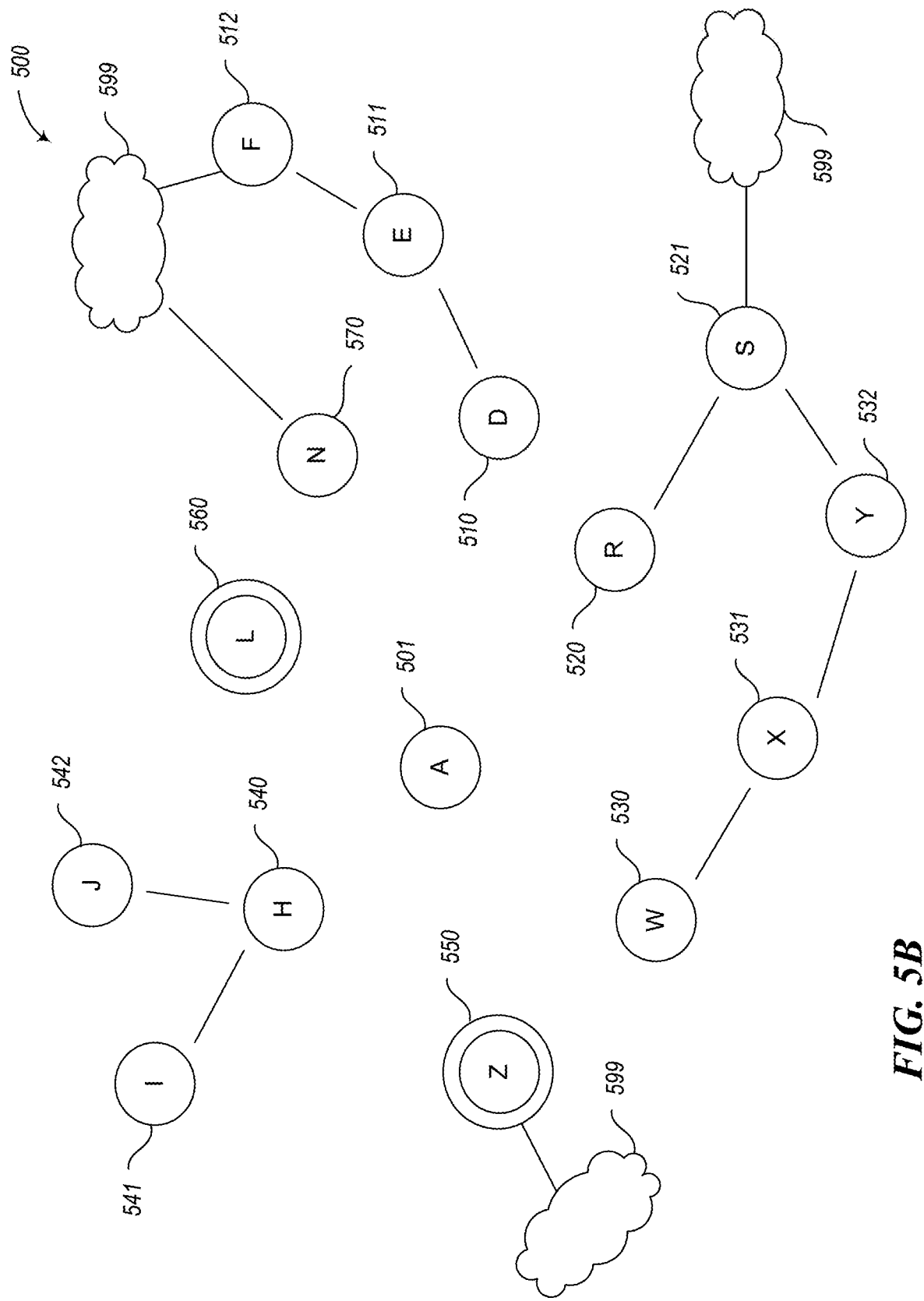
FIG. 5B is a network diagram showing a second sample environment in which the facility operates.

FIG. 5A is a network diagram showing a first sample environment in which the facility operates. In the environment 500 shown in FIG. 5A, node A 501 arrives in the location in which it is shown, and seeks to connect to a wireless network available at that location. In this location, node A receives announcement messages from five nodes operating as access points: node D 510, node R 520, node W 530, node H 540, and node Z 550. These announcement messages may broadcast or advertise that node's presence to other nodes. For example, if node D is a participant node, as discussed above, then the announcement message transmitted by node D may be a notification signal that includes that nodes standard and expanded metadata to other participants. The double-circle around node Z indicates that it does not include expanded metadata attributes in its announcement message, such as a non-participant node; on the other hand, nodes D, R, W, and H do include expanded metadata attributes, such as participant nodes. Node D is connected to node F 512—which has a wired connection to the Internet 599—via node E 511. Node D is said to be connected to the Internet by two wireless hops: a first wireless hop between nodes D and E, and a second wireless hop between nodes E and F. Node R is connected to node S 521 which has a wired connection to the Internet. Node R is said to be connected to the Internet by one wireless hop. Node W is connected to node S via two intermediate nodes, node X 531 and node Y 532. Node W is said to be connected to the Internet by three wireless hops. Node H is connected to nodes I 541 and J 542. Node H is not connected to the Internet, either directly or indirectly. Node Z is directly connected to the Internet. As described in more detail herein, the facility executing on node A determines which of nodes D, R, W, H, and Z node A connects to. FIG. 5B shows a similar environment, and is discussed below.

Figure 6:
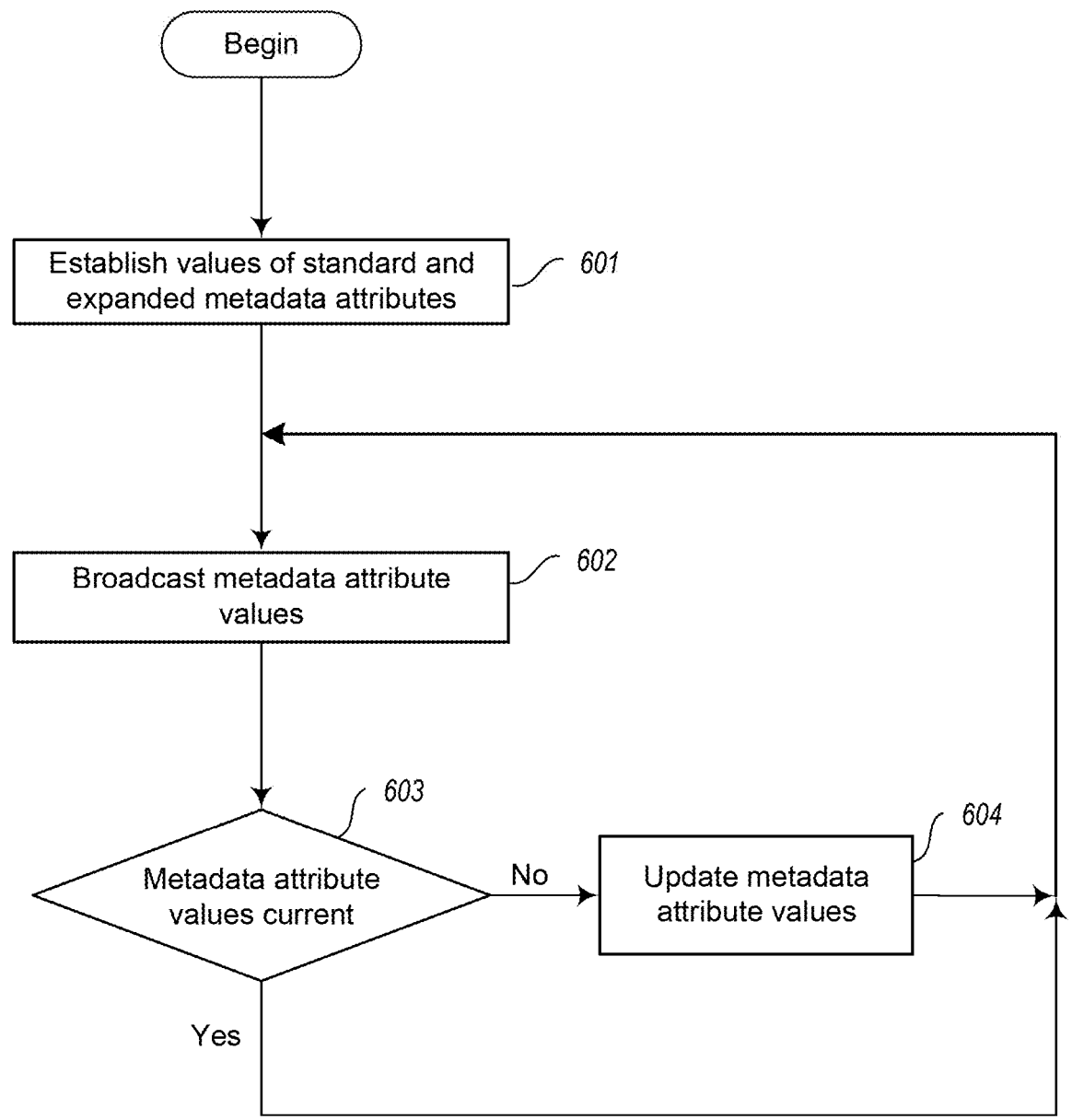
FIG. 6 is a flow diagram showing a process performed by the facility in some embodiments in order to send network announcement messages that include values for expanded metadata attributes.

FIG. 6 is a flow diagram showing a process performed by the facility in some embodiments in order to send network announcement messages that include values for expanded metadata attributes. In act 601, the facility establishes its values for both standard metadata attributes and expanded metadata attributes. Particular attributes of these two different types are discussed in greater detail below in connection with FIGS. 7 and 8. In act 602, the facility broadcasts the values established in act 601 for metadata attributes of both types. In some embodiments, the facility broadcasts these values in a network announcement message, such as an 802.11 beacon frame. Beacon frames are described in greater detail in "IEEE Draft Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications," in P802.11-REVmd/D2.0, December 2018, vol., no., pp. 1-4601, 17 Jan. 2019, available at ieeexplore.ieee.org/document/8624660; Control and Provisioning of Wireless Access Points (CAPWAP) Protocol Binding for IEEE 802.11, Internet Engineering Task Force RFC 5416, available at datatracker.ietf.org/doc/html/rfc5416; and Network Discovery and Selection Problem, Internet Engineering Task Force RFC 5416, available at datatracker.ietf.org/doc/html/rfc5113; each of which is hereby incorporated by reference in its entirety. In cases where particular contents of a document incorporated herein by reference conflict with the present patent application, the present application controls.

In act 603, if the metadata attribute values established in act 601 are current, then the facility continues in act 602 to broadcast them again when the present broadcast cycle expires, such as in five seconds, else the facility continues in act 604. In act 604, the facility updates the metadata attribute values to be current. After act 604, the facility continues in act 602.

FIG. 7 is a table diagram showing first sample contents of a node attribute table showing attribute values determined by the facility for node D shown in FIG. 5A. As one example, table 700 includes the standard and expanded metadata received from another participant node. The table 700 is made up of rows each corresponding to an attribute of node D: rows 711-717 correspond to values of standard attributes, while rows 721-723 correspond to values of expanded attributes. Each row is divided into the following columns: an attribute type column 701 indicating whether the attribute is a standard attribute or an expanded attribute; attribute name column 702 identifying the name of the attribute; and attribute value column 703 identifying the value of the attribute determined by the facility for node D. As examples, row 711 indicates that node D's SSID is "Ogrid_94671"; row 712 indicates that node D's bandwidth score is 35 compared to a maximum of 100; row 721 indicates that node D is not directly connected to the Internet; row 722 indicates that node D is connected to the Internet, either directly or indirectly; and row 723 indicates that node D has a hop count of two wireless hops to reach the Internet. In some embodiments (not shown), instead of referring to the Internet, rows 721-723 refer to other inter-networks, i.e. other meta-networks or "networks of networks."

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

In some embodiments, the facility encodes values of the expanded attributes in a device type field of announcement messages, or notification signals, generated and sent by the facility. In some embodiments, the facility encodes the expanded attributes of node D the following device type value: 0x57544015. In particular, the first four hex digits—5754—identify the last four hex digits—4015—as containing expanded attribute values. Specifically, in the fifth hex digit—0x4, bx0100—the highest order three bits—0b010, 0d2—represent the hop count of node D, 2. In the eighth hex digit—0x5, 0b0101—the third bit—0b0—represents node D's value of the Direct attribute, false; the fourth bit—0b1—represents node D's value of the Internet attribute, true. In various embodiments, the facility performs encodings of the expanded attributes in a different manner, or stores them a different part of the network announcement message. In various embodiments, the facility includes various other combinations of expanded included in the network announcement message. Attributes having single-bit values capable of encoding two different states are sometimes called "flags."

FIG. 8 is a table diagram showing second sample contents of a node attribute table showing attribute values determined by the facility for node Z shown in FIG. 5A. As one example, table 800 includes the standard metadata received from a non-participant node. FIG. 8 is similar to FIG. 7, except that column 803 of table 800 shown in FIG. 8 contains different attribute values than column 703 shown in FIG. 7, in each of rows 811-817 and 821-823. In particular, rows 821-823 contain no expanded attribute values for node Z. This may be the case where the facility is unable to determine values for these attributes, or, as in the case of node Z, where the access point node is not operated by the facility and is therefore not aware of expanded attributes; does not determine values for expanded attributes; and does not advertise values for expanded attributes.

Figure 9:
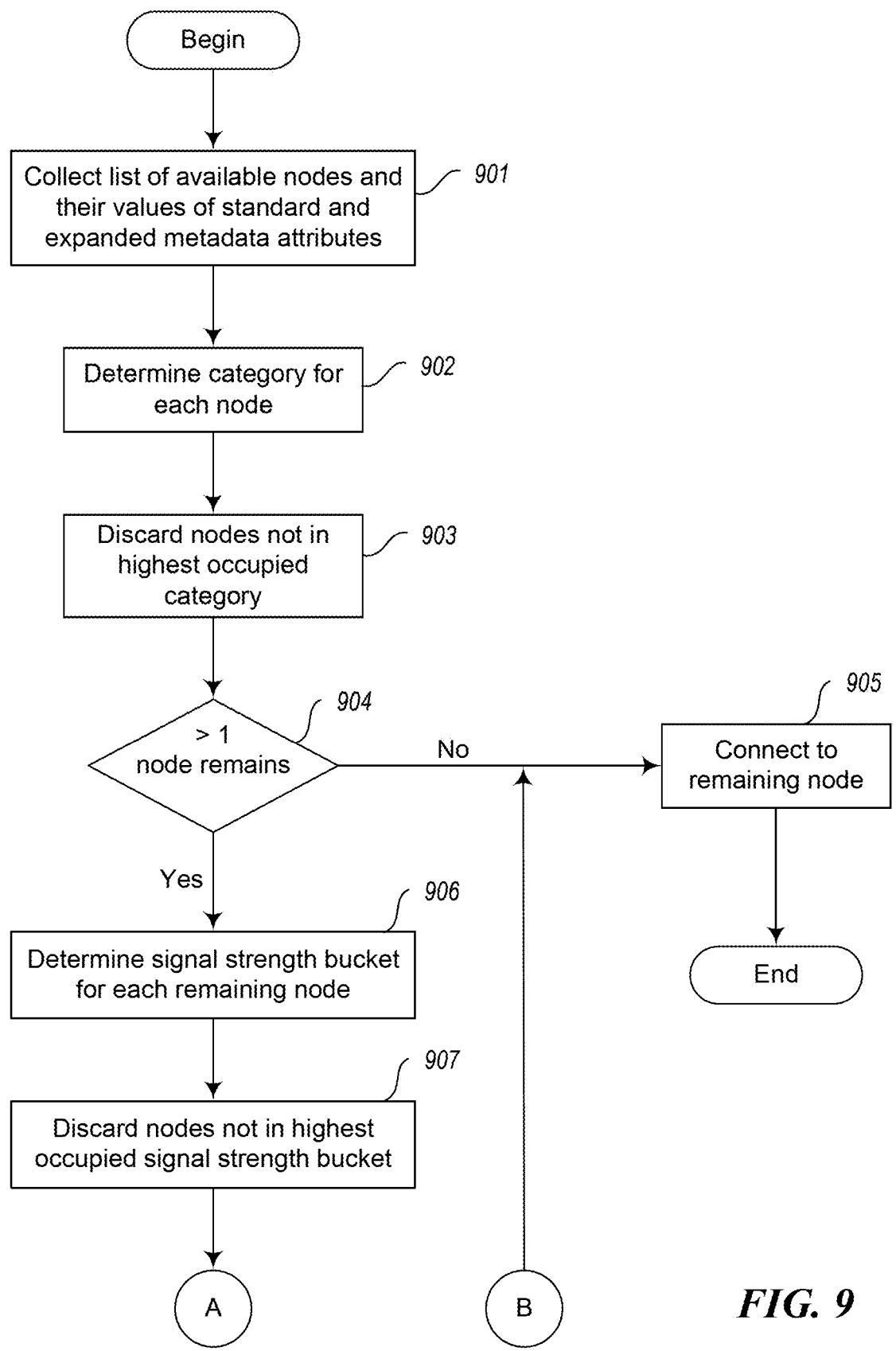
Figure 9:
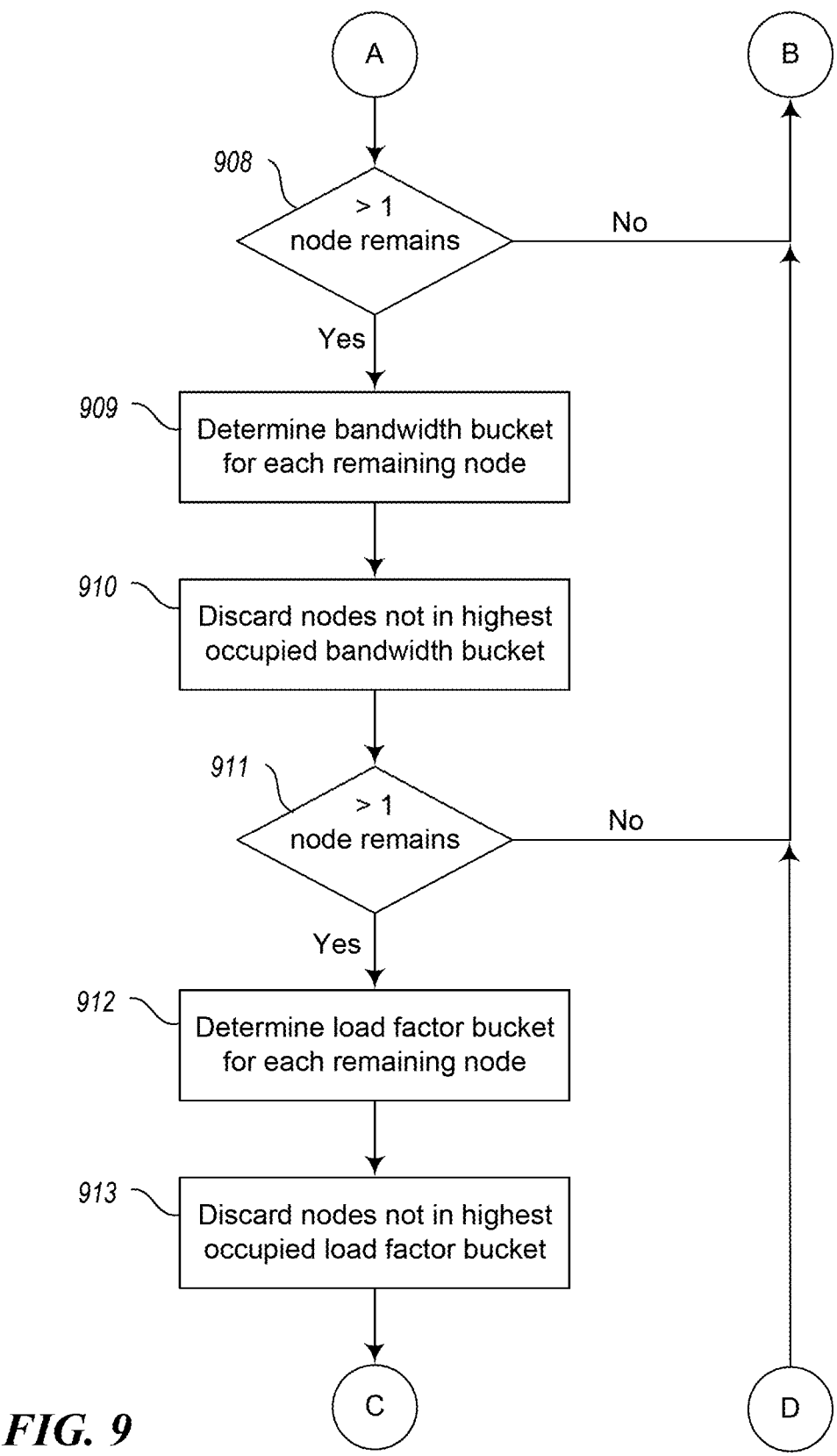
Figure 9:
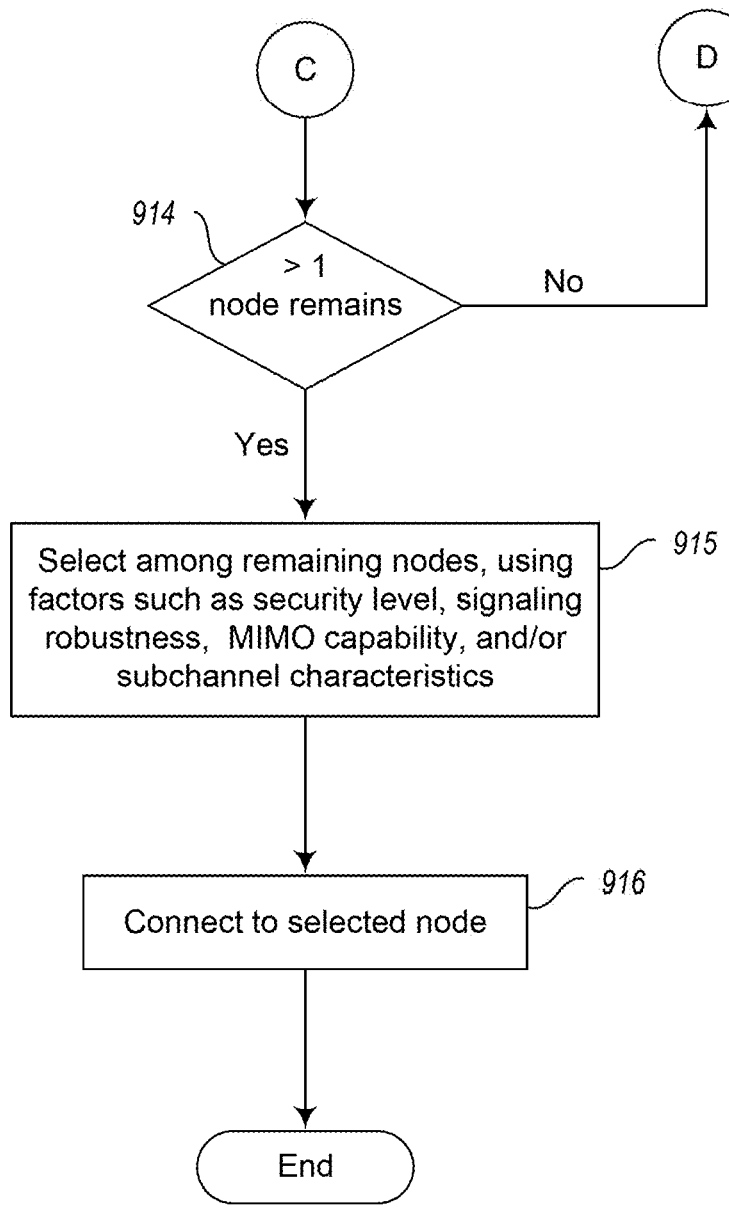

FIG. 9, which spans three sheets of drawings, is a flow diagram showing a process performed by the facility in some embodiments in a node to choose a wireless network access point for the node to connect to. In act 901, the facility collects a list of available access point nodes (non-participant nodes and other participant nodes that are within line-of-sight communication with the participant node) and their values of the standard and expanded metadata attributes, such as by monitoring for and recording beacon frames received by the node, and/or network announcement messages of various other types. In the example discussed above, node A collects attribute values for access point nodes D, R, W, H, and Z. The attribute values collected by node A for nodes D and Z are as shown in FIGS. 7 and 8 discussed above. In act 902, the facility determines a category for each node. Details of act 902 are discussed below in connection with FIG. 10.

Figure 10:
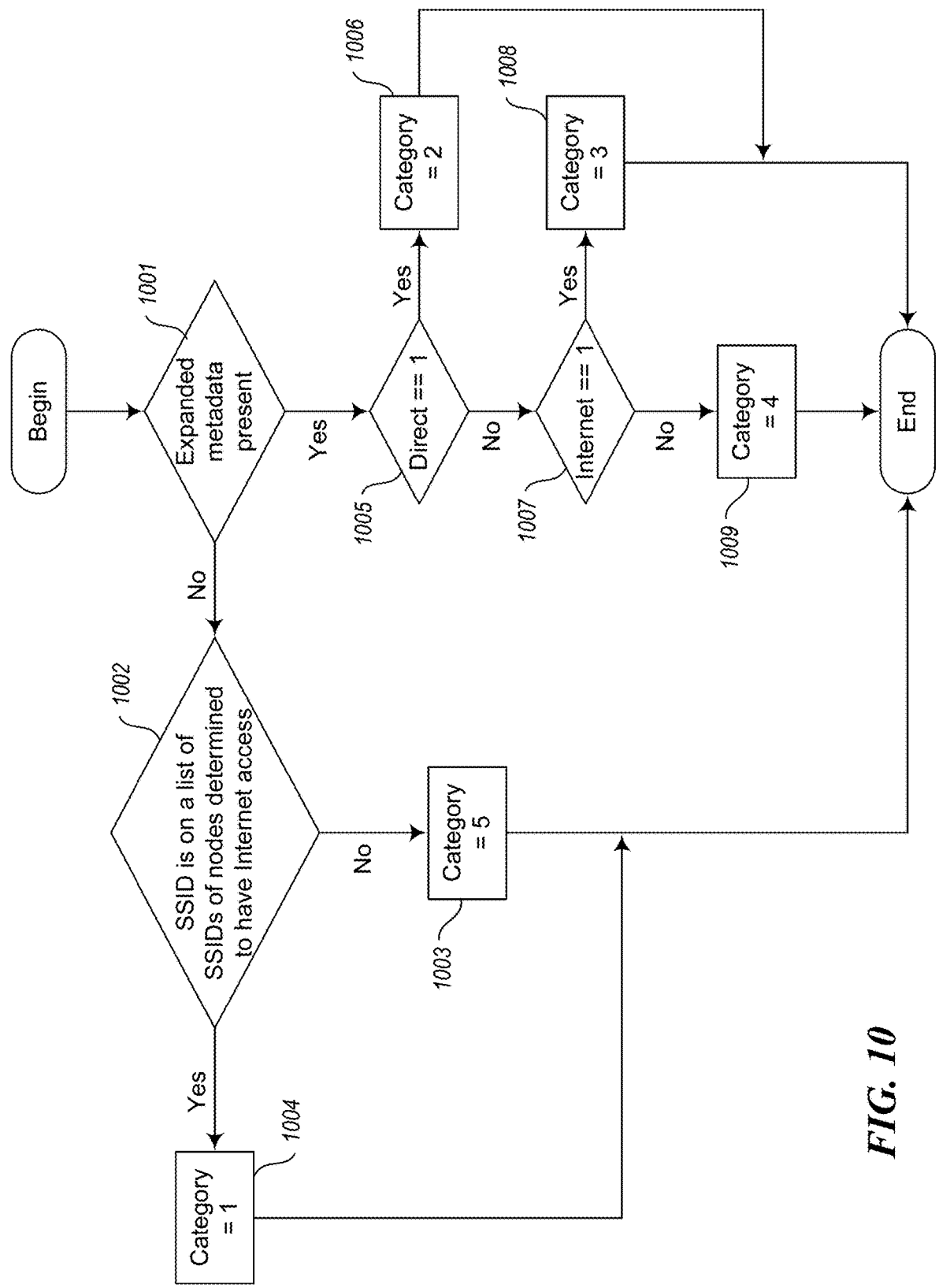
FIG. 10 is a flow diagram showing a process performed by the facility in some embodiments in order to classify an access point node into a category.

FIG. 10 is a flow diagram showing a process performed by the facility in some embodiments in order to classify an access point node into a category. In act 1001, if values of expanded metadata are present in the access point node's announcement message, then the facility continues in act 1005, else the facility continues in act 1002. In act 1002, if the access point node's SSID—i.e., its network name—is on a list of SSIDs whose nodes have been determined to have Internet access, the facility continues in act 1004 to classify the access point node in category 1, else the facility continues in act 1003 to classify the access point node in category 5. In some embodiments, it is not possible in the absence of expanded metadata for the facility to determine whether a connection to the Internet by the access point node is direct or indirect. After each of acts 1003 and 1004, this process concludes. In act 1005, where values of expanded metadata are present, if the access point node's value of the Direct expanded metadata attribute is 1 (i.e., true), then the facility continues in act 1006 to classify the access point node in category 2, else the facility continues in act 1007. After act 1006, this process concludes. In act 1007, if the access point node's value of the Internet expanded metadata attribute is 1 (i.e., true), then the facility continues in act 1008 to classify the access point node in category 3, else the facility continues in act 1009 to classify the access point node in category 4. After each of acts 1008 and 1009, this process concludes.

In this example, category 1 has a highest ordered rank and category 5 has a lowest ordered rank, with categories 2, 3, and 4 sequentially ranked between categories 1 and 5. In other embodiments, the categories may be ranked in a different order. The order of the category ranks may be set by an administrator or user of a participant node. Moreover, the order of the category ranks may change based on the operation or security needs of the participant node. For example, if the participant node is sending highly sensitive data, category 1 may be the lowest rank, whereas category 3 may be the highest rank. Category rank is sometimes also referred to as category order. By applying the process shown in FIG. 10, the facility arrives at the following classification of the access point nodes in the example shown below in Table 1:

TABLE 1

| | |
|---|---|
| Category 1: | node Z |
| Category 2: | (none) |
| Category 3: | nodes D, R, and W |
| Category 4: | node H |
| Category 5: | (none) |

Returning to FIG. 9, in act 903, the facility discards nodes not in the highest occupied category. In the example, the highest occupied category is category 1. Accordingly, in processing the example, in act 903, the facility discards nodes D, R, W, and H—that is, all nodes except node Z. In a second example in which node Z not present, the facility discards node H, retaining nodes D, R, and W.

In act 904, if more than one node remains, then the facility continues in act 906, else the facility continues in act 905. In act 905, the facility connects to the remaining node. In the first example, the facility connects node A to node Z in act 905 because node Z is the only node remaining in category 1. After act 905, this process concludes.

In act 906, where more than one access point node remains, the facility determines a signal strength bucket for each remaining node. In some embodiments, the facility determines a signal strength for each access point node by measuring a power level at which the access point node's network announcement message is received. For example, in some embodiments in which the signal strengths of the access point nodes are expressed in terms of a score in the range 1-100, the facility uses the buckets shown below in Table 2:

TABLE 2

| | |
|---|---|
| bucket 1: | score > 90 |
| bucket 2: | 80 < score <= 90 |
| bucket 3: | 70 < score <= 80 |
| bucket 4: | 60 < score <= 70 |
| bucket 5: | 50 < score <= 60 |
| bucket 6: | 40 < score <= 50 |
| bucket 7: | 30 < score <= 40 |
| bucket 8: | 80 < score <= 30 |
| bucket 9: | 80 < score <= 20 |
| bucket 10: | score <= 10 |

In the second example, in a case where node D has a signal strength score of 61; node R has a signal strength score of 69; and node W has a signal strength score of 37, the facility assigns these nodes to signal strength score buckets as shown below in Table 3:

TABLE 3

| | |
|---|---|
| signal strength bucket 1: | (none) |
| signal strength bucket 2: | (none) |
| signal strength bucket 3: | (none) |
| signal strength bucket 4: | nodes D and R |
| signal strength bucket 5: | (none) |
| signal strength bucket 6: | (none) |
| signal strength bucket 7: | node W |
| signal strength bucket 8: | (none) |
| signal strength bucket 9: | (none) |
| signal strength bucket 10: | (none) |

In act 907, the facility discards nodes that are not in the highest occupied signal strength bucket. In the second example, the highest occupied signal strength bucket is bucket 4, and the facility discards the only node not in bucket 4, node W, retaining nodes D and R. After act 907, the facility proceeds through connector A to act 908 shown on a second sheet of FIG. 9. In act 908, if more than one node remains, then the facility continues in act 909, else the facility continues through connector B to act 905. In act 909, the facility determines a bandwidth bucket for each remaining node. For example, in some embodiments in which the bandwidths of the access point nodes are expressed in terms of a score in the range 1-100, the facility uses the buckets shown above in Table 2. In the second example, in a case where node D has a bandwidth score of 85 and node R has a bandwidth score of 48, the facility assigns these nodes to bandwidth buckets as shown below in Table 4:

TABLE 4

| | |
|---|---|
| bandwidth bucket 1: | (none) |
| bandwidth bucket 2: | node D |
| bandwidth bucket 3: | (none) |
| bandwidth bucket 4: | (none) |
| bandwidth bucket 5: | (none) |
| bandwidth bucket 6: | node R |
| bandwidth bucket 7: | (none) |
| bandwidth bucket 8: | (none) |
| bandwidth bucket 9: | (none) |
| bandwidth bucket 10: | (none) |

In act 910, the facility discards nodes not in the highest occupied bandwidth bucket. In example 2, the highest occupied bandwidth bucket is bucket 2. Accordingly, in processing the second example, in act 910, the facility discards the only node not in bucket 2, node R, leaving only node D. In act 911, if more than one node remains, then the facility continues in act 912, else the facility continues through connector B to act 905. Thus, in the second example, node A connects to node D.

In act 912, the facility determines a load factor bucket for each remaining node, such as is described above in connection with acts 906 and 909. In act 913, the facility discards nodes not in the highest occupied load factor bucket. After act 913, the facility continues through connector C to act 914 shown on a third sheet of FIG. 9. In act 914, if more than one node remains, then the facility continues in act 915, else the facility continues through connectors D and B to act 905. In act 915, the facility selects among the remaining nodes, using factors such as their relative security levels, signaling robustness, MIMO capability, and/or sub channel characteristics. In act 916, the facility connects to the node selected in act 915. After act 916, this process concludes.

Although FIG. 9 discusses the usage of signal strength, bandwidth, and load, some embodiments are not so limited. In various embodiments, the facility considers only signal strength, only bandwidth, or only load; the facility considers other network communication characteristics, or considers some combination of the foregoing. Accordingly, the node selected by the facility for connection for a highest ranking category may be determined from ranked signal strength buckets, ranked bandwidth buckets, ranked load factor buckets, or other ranked connection characteristic bucket, or some combination thereof.

FIG. 5B is a network diagram showing a second sample environment in which the facility operates. In addition to the nodes shown in the environment shown in FIG. 5A and discussed above, the environment 500 shown in FIG. 5B contains two additional nodes from which node A receives announcement messages: node L 560 and node N 570. Neither node L nor node N is connected to any other wireless node. Node N is directly connected to the Internet. Node L is not connected to the Internet, either directly or indirectly; like node E, it does not include expanded metadata attributes in its announcement message. FIG. 5B shows available nodes in each of the five categories: node C in category 1; node N in category 2; nodes D, R, and W in category 3; node H in category 4; and node L in category 5.

Figure 11:
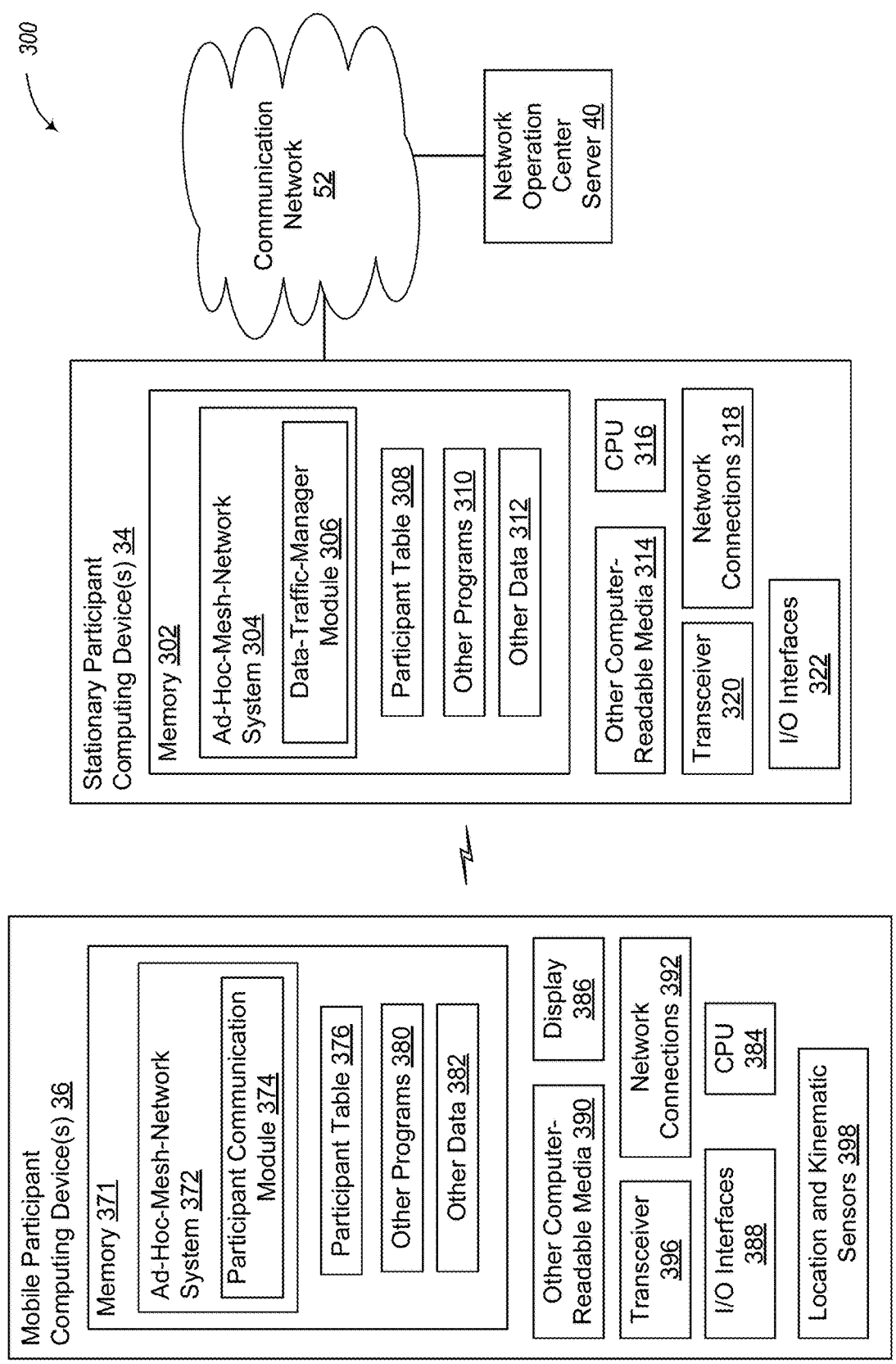
FIG. 11 shows a system diagram that describes one implementation of computing systems for implementing embodiments described herein.

FIG. 11 shows a system diagram that describes one implementation of computing systems for implementing embodiments described herein. System 300 includes mobile participant computing device(s) 36, stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 34 may include memory 371, one or more central processing units (CPUs) 384, display 386, I/O interfaces 388, other computer-readable media 390, network connections 392, transceiver 396, and motion sensors or other sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes participant communication module 374. The participant communication module 374 may employ embodiments described herein to send notification signals, track participants via participant table 376, and to generate and transfer data and communications to other participants.

The memory 371 also stores participant table 376. In various embodiments, this is a local version of the participant table generated by the mobile participant or received from a stationary participant 34 or other mobile participant 36. The participant table 376 may be a partial version or a complete version of the participant table 308 maintained by the stationary participants 34 or by mobile participants if stationary participants are unavailable.

The memory 371 may also store other programs 380 and other data 382. The other programs 380 may include user applications, other tracking or geo-positioning programs, etc. The other data 382 may include data or information regarding one or more non-participant objects or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be a omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of own self-reported notifications, GPS modules, accelerometers, gyroscopes, or other sensors that can be used to determine the position and kinematic information of the mobile participant computing device 36.

Other I/O interfaces 322 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306. The data-traffic-manager module 306 may employ embodiments described herein to transfer data from one participant to another participant and to manage and provide participant table updates. In various embodiments, data-traffic-manager module 306 may communicate with network operation center server 40 via communication network 52, such as to provide or receive participant table updates.

The memory 302 may also store participant table 308, other programs 310, and other data 312. The participant table 308 may be a full version of the participant table 308 or it may be a partial version based on those mobile participants 36 within line-of-sight of or a threshold number of hops from the stationary participant 34. The other data 312 may include data or information regarding one or more tracked objects or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 322 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the positioning and movement of non-participant objects that are reported to it by the mobile participant computing devices 36 or the stationary participant computing devices 34. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

Figure 12:
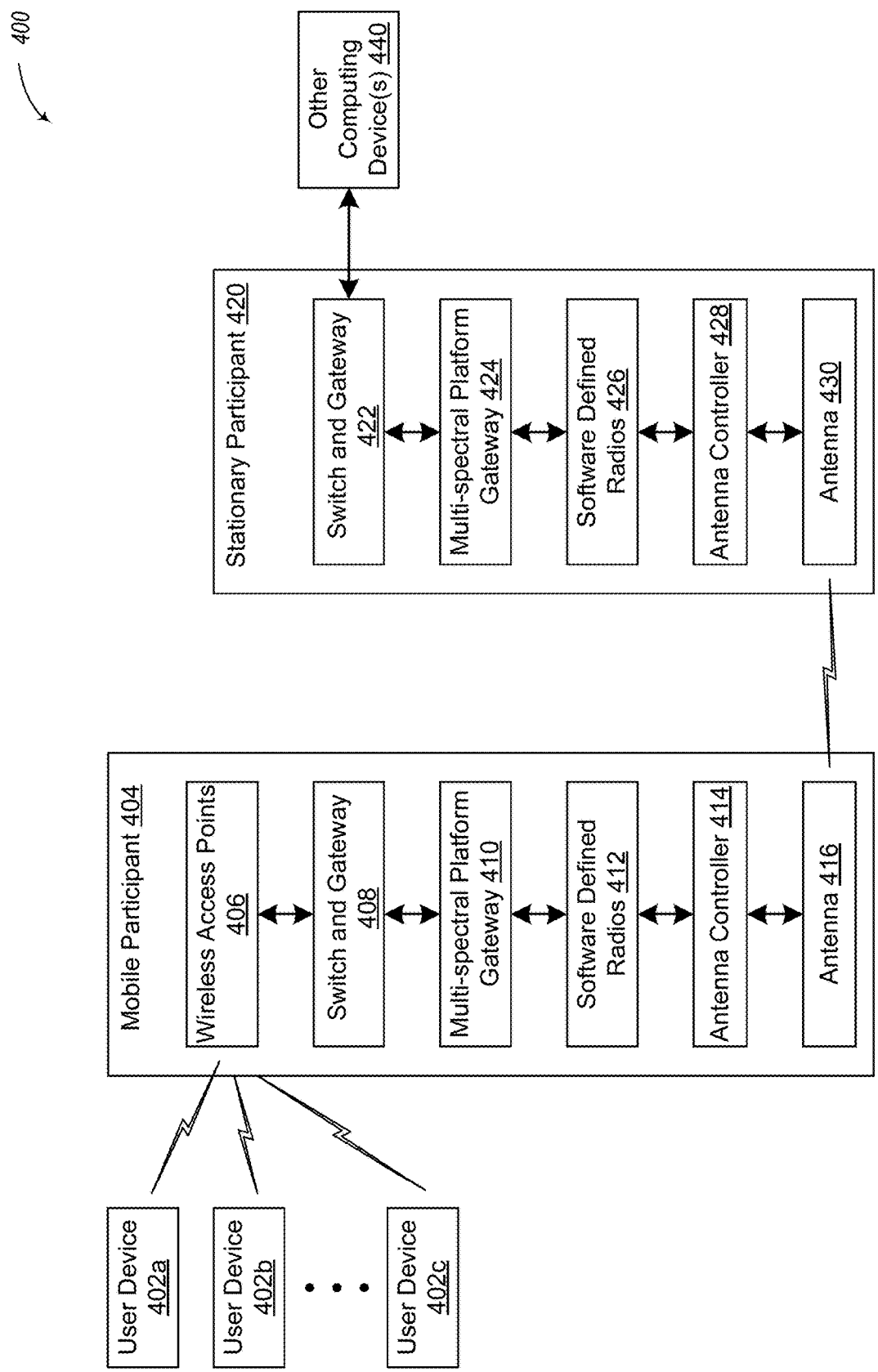
FIG. 12 shows a system diagram that describes another implementation of computing systems for implementing embodiments described herein.

FIG. 12 shows a system diagram that describes another implementation of computing systems for implementing embodiments described herein. System 400 includes user devices 402a-402c that are in wireless line-of-sight communication with mobile participant 404, which is in wireless line-of-sight communication with stationary participant 420, which is in wired communication with other computing device 440. As described above, user devices 402a-402c may be tier 1 mobile participants in communication with a tier 3 mobile participant or some other mobile participant.

Mobile participant 404 may be an embodiment of a mobile participant 32 and stationary participant 420 may be an embodiment of a stationary participant 34 discussed above.

Mobile participant 404 includes one or more wireless access points 406 to communicate with user devices 402a-402c. Switch and gateway 408 coordinates and handles communications between the wireless access points 406 and a multi-spectral platform gateway 410. The multi-spectral platform gateway 410 performs embodiments described herein to update the participant table and to select an optimum route, spectrum and antenna to transmit communications from the mobile participant 404. The multi-spectral platform gateway 410 also selects many transmission characteristics based on information in the participant table and provides them to one or more software defined radios 412. The software defined radios 412 select the frequency from the multi-spectral platform gateway selected spectrum at which to transmit communication from the mobile participant 404. The antenna controller 414 form and steer a transmission beam via antenna 416 based on the selected transmission information, the selected frequency, and the multi-spectral platform gateway provided location of intended recipient. This transmission may be directed to another mobile participant 404, another type of mobile participant, or to the stationary participant 420.

In some embodiments, the mobile participant 404 may store or cache a threshold amount of data received from or provided to the user devices 402a-402c. The data may be cached for a threshold amount of time or storage space. In this way, if a user device subsequently requests the same data that was already obtained for another user device, such as a movie or other in-flight entertainment, then the mobile participant 404 can provide the cached data to the user device without having to transmit additional communications to other participants to obtain the data. In some embodiments, forwarding participants may also cache data for a predetermined amount of time, which can act as a backup in case the forwarded communication was not successfully received or if the forwarding participant has to select another route to transmit the communication. In yet other embodiments, the cached data can be used to answer a request from another participant so that they do not have to request the information from a stationary participant, which can alleviate wasted network usage by transferring data that has already been transferred from the internet or other source previously.

Stationary participant 420 receives the transmission from the mobile participant 404 at an antenna controller 428 via antenna 430 and provides the received signals to a software defined radio 426. The software defined radio 426 provides the received communications to a multi-spectral platform gateway 424, which determines whether the communication should be transmitted to a next participant, such as another mobile participant 404, some other mobile participant, or to another stationary participant 420 via a wired network, or whether the communication is to be provided to other computing devices 440. If the communication is to be transmitted to another mobile participant or another mobile participant via line-of-sight communications, then the stationary participant 420 utilizes the multi-spectral platform gateway 424, the software defined radios 426, the antenna controller 428, and the antenna 430 in a manner similar to mobile participant 404 to directionally transmit the communication to a next participant. If the communication is destined for some other non-participant computing device, then the multi-spectral platform gateway 424 provides the communication to switch and gateway 422 for transmission via a wired communication network to other computing devices 440.

If the communication was for data or information from the other computing devices 440, then the other computing devices 440 may answer a request and return data or information to the stationary participant 420 for transmission to the mobile participant 404 and then to the requesting user device 402 in a somewhat reverse fashion than what is described above.

One non-limiting non-exhaustive example of components utilized by the mobile participant 404 may include, but is not limited to: a conformal and non-conformal electronically steered antenna array, cabling appropriate for array and radio communication, cognitive radio suites that both receive and transmit in pairs suitable to service the entirety of the participant max capacity, cabling appropriate for radio to host platform communication, cabling from host platform to server and in-flight entertainment suite, onboard server with up to 10 TB of storage, onboard cognitive modems and routers with public address capability, cognitive equipment power supplies, cognitive radio transmission amplifier and power supply, and onboard firewall.

One non-limiting non-exhaustive example of components utilized by the mobile participant 404 may include, but is not limited to: an adaptive power backup generator, cognitive multi-spectral antennas×6, 42U rack, rack mounted server, integrated processor chip, SSL & VPN appliance, external firewall appliance, internal firewall appliance, load management appliance, web filter appliance, multi-spectral cognitive Radio×4, High throughput router, smart power strip/UPS, mesh network Wi-Fi appliances, small mesh network home appliances, wireless access points with public address appliances, and backhaul connectivity.

In various embodiments, communications between participants may include one or multi-level security. For example, in some embodiments, all transmission via the participant network may employ a first encryption or security mechanism. Some communications between participants may further include another layer of security. For example, a user may have a cell phone and a home network. The cell phone may be a mobile participant and a router on the home network may be a participant access node. The home network may be protected by Wired Equivalent Privacy (WEP), Wi-Fi Protected Access (WPA), Wi-Fi Protected Access II (WPA2), or other security mechanism. In this example, the cell phone participant may first encrypt communications via the same security mechanism as the home network and then encrypt the communications using the network encryption. The cell phone participant employs embodiments described herein to route the encrypted communications to the router participant, which can decrypt the communication using the network encryption mechanism and then the home network security mechanism. Even additional layers of encryption and security can be employed for a group of users or devices, subsets of users in the group, individuals in those subsets, etc.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network" and Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR)," are incorporated herein by reference, in their entirety.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a mobile communication device, the method comprising:
for each of a plurality of communication devices other than the mobile communication device:
receiving a network announcement message from the communication device containing a value of each of one or more metadata attributes determined for the communication device;
based on the metadata attributes for which values are contained in the network announcement message received from the communication device, classifying the communication device into one of a plurality of categories, wherein each separate category of the plurality of categories has a ranking relative to each other category of the plurality of categories to create a rank order from a highest-ranked category to a lowest-ranked category;
identifying the highest-ranked category into which at least one communication device is classified; where only one communication device is classified into the identified category, wirelessly connecting the mobile communication device to the one communication device classified into the identified category;
where more than one communication device is classified into the identified category: for each of the communication devices classified into the identified category:
determining a connection strength from the communication device to the mobile communication device; and
classifying the communication device into one of a plurality of connection strength buckets based on the connection strength determined for the communication device, wherein each separate connection strength bucket of the plurality of connection strength buckets corresponds to a different connection strength range such that the plurality of connection strength buckets have an order;
identifying the highest connection strength bucket into which at least one communication device is classified;
where only one communication device is classified into the identified connection strength bucket, wirelessly connecting the mobile communication device to the one communication device classified into the identified connection strength bucket;
where more than one communication device is classified into the identified connection strength bucket:
selecting one of the more than one communication devices classified into the identified connection strength bucket based on the metadata attributes for which values are contained in the network announcement message received from the communication device; and wirelessly connecting the mobile communication device to the selected communication device.

2. The method of claim 1 wherein each received network announcement message is a beacon frame.

3. The method of claim 1 wherein each received network announcement message contains a value of each of (1) one or more standard metadata attributes defined by a wireless standard, and (2) one or more expanded metadata attributes not defined by a wireless standard, and wherein the classifying is based at least in part on at least one of the one or more expanded metadata attributes.

4. The method of claim 3 wherein the values of the one or more expanded metadata attributes are encoded in a device type header field of the received network announcement message.

5. The method of claim 3 wherein criteria used to classify communication devices into one or more of the plurality of categories comprise: whether a communication device has direct access to an internetwork; whether a communication device has indirect access to an internetwork; for a communication device that has indirect access to an internetwork, a number of wireless hops that separate the communication device from the internetwork which the communication device has indirect access; and whether values of at least one expanded metadata attribute are received for a communication device.

6. The method of claim 3 wherein the plurality of categories comprise: a first category having a first rank, the first category containing communication devices that are directly connected to an internetwork, and whose network announcement message contains no values of expanded metadata attributes, the first rank being higher in the rank order than a second, third, fourth, and fifth rank; a second category having the second rank, the second category containing communication devices that are directly connected to an internetwork, and whose network announcement message contains values of at least one expanded metadata attribute are received, the second rank being lower in the rank order than the first rank, and higher in the rank order than the third, fourth, and fifth rank; a third category having the third rank, the third category containing communication devices that are indirectly connected to an internetwork, and whose network announcement message contains values of at least one expanded metadata attribute are received, the third rank being lower in the rank order than the first and second ranks, and higher in the rank order than the fourth and fifth ranks; a fourth category having the fourth rank, the fourth category containing communication devices that are not connected to an internetwork, and whose network announcement message contains values of at least one expanded metadata attribute are received, the fourth-ranked being lower in the rank order than the first, second, and third ranks, and higher in the rank order than the fifth rank; and a fifth category having the fifth rank, the fifth category containing communication devices that are not connected to an internetwork, and whose network announcement message contains no values of expanded metadata attributes are received the fifth rank being lower in the rank order than the first, second, third, and fourth ranks.

7. The method of claim 1 wherein at least a portion of the plurality of communication devices are mobile communication devices.

8. The method of claim 1 determining a connection strength from the communication device to the mobile communication device comprises measuring a power level at which the network announcement message is received from the communication device.

9. The method of claim 1 wherein selecting one of the more than one communication devices classified into the identified connection strength bucket is performed based on criteria including any of: security level, signaling robustness, number of sending and receiving antennas in use, or sub-channel characteristics.

10. A mobile communication device, comprising: a memory that stores computer instructions; and at least one processor configured to execute the computer instructions to:
 receive a network identification message from a plurality of other communication devices, wherein the network identification message for a corresponding communication device includes one or more metadata attributes regarding the corresponding communication device;
 classify each of the plurality of other communication devices into one of a plurality of ranked categories based on the metadata attributes received from the corresponding communication device, wherein each separate category of the plurality of ranked categories has a ranking relative to each other category of the plurality of ranked categories to create a rank order from a highest-ranked category to a lowest-ranked category;
 select a category that is a highest-ranked category into which at least one communication device is classified;
 in response to only one communication device being classified into the selected category, establish a connection between the mobile communication device and the one communication device classified into the selected category; and
 in response to more than one communication device being classified into the selected category:
 determine a network communication characteristic between the mobile communication device and each communication device being classified into the selected category;
 classify each communication device being classified into the selected category into one of a plurality of ranked connection characteristic buckets based on the network communication characteristic determined for the communication device, wherein each separate connection characteristic bucket of the plurality of ranked connection characteristic buckets corresponds to a different connection characteristic range such that the plurality of ranked connection characteristic buckets have an order;
 select a connection characteristic bucket that is a highest connection characteristic bucket into which at least one communication device is classified;
 select one of at least one communication device classified into the selected connection characteristic bucket based on the metadata attributes received from the communication device; and
 establish a connection between the mobile communication device and the selected one communication device.

* * * * *